United States Patent [19]

Withers et al.

[11] Patent Number: 5,771,170
[45] Date of Patent: Jun. 23, 1998

[54] SYSTEM AND PROGRAM FOR LOCATING SEISMIC EVENTS DURING EARTH FRACTURE PROPAGATION

[75] Inventors: Robert J. Withers, Plano, Tex.; Shirley A. Rieven, Acton, Mass.; Mary J. Cole, Plano, Tex.

[73] Assignee: Atlantic Richfield Company, Los Angeles, Calif.

[21] Appl. No.: 706,002

[22] Filed: Aug. 30, 1996

Related U.S. Application Data

[63] Continuation-in-part of Ser. No. 196,621, Feb. 14, 1994.

[51] Int. Cl.[6] .................................................. G06F 19/00
[52] U.S. Cl. ................................ 364/421; 364/422
[58] Field of Search ................................ 364/420, 421, 364/422

[56] References Cited

U.S. PATENT DOCUMENTS

| | | |
|---|---|---|
| 3,108,439 | 10/1963 | Reynolds et al. . |
| 3,262,274 | 7/1966 | Nelson, Jr. . |
| 3,292,693 | 12/1966 | Hill et al. . |
| 3,331,206 | 7/1967 | Osborne . |
| 3,335,798 | 8/1967 | Querio et al. . |
| 3,374,633 | 3/1968 | Brandt . |
| 3,513,100 | 5/1970 | Stogner . |
| 3,576,513 | 4/1971 | Mathison et al. . |
| 3,739,871 | 6/1973 | Bailey et al. . |
| 3,852,967 | 12/1974 | Stewart et al. . |
| 4,057,780 | 11/1977 | Shuck . |
| 4,167,213 | 9/1979 | Stoltz et al. . |
| 4,524,434 | 6/1985 | Silverman . |
| 4,630,868 | 12/1986 | Jones et al. . |
| 4,787,452 | 11/1988 | Jennings, Jr. . |
| 4,802,144 | 1/1989 | Holzhausen et al. . |
| 4,828,030 | 5/1989 | Jennings, Jr. . |
| 4,889,186 | 12/1989 | Hanson et al. . |
| 4,906,135 | 3/1990 | Brassow et al. . |
| 4,942,929 | 7/1990 | Malachosky et al. . |
| 5,010,527 | 4/1991 | Mahrer . |
| 5,108,226 | 4/1992 | Jennings, Jr. . |
| 5,109,933 | 5/1992 | Jackson . |
| 5,129,469 | 7/1992 | Jackson . |
| 5,133,624 | 7/1992 | Cahill . |
| 5,191,157 | 3/1993 | Crocker . |
| 5,242,025 | 9/1993 | Neill et al. . |
| 5,360,066 | 11/1994 | Venditto et al. . |
| 5,377,104 | 12/1994 | Sorrells et al. . |
| 5,405,224 | 4/1995 | Aubert et al. . |

OTHER PUBLICATIONS

Fix, James E., "Hydraulic Fracture Azimuth and Dimensional Characterization: Advanced Applications of Continuous Microseismic Radiation," Teledyne Geotech, Garland, TX 75040.

(List continued on next page.)

Primary Examiner—Donald E. McElheny, Jr.
Attorney, Agent, or Firm—David L. McCombs

[57] ABSTRACT

A system and computer program for determining the location of a seismic event in an earth formation zone using seismic traces corresponding to the event collected from one or more sensors in the zone. A graphical data window is displayed of the seismic traces corresponding to the event, the traces representing observed arrival time signals from the sensors plotted with respect to time. A window of a base map of the positions of the sensors within the zone is also displayed. Displayed in the data window is a curve plotting calculated arrival time signals for the traces, the curve being developed from a user-selected one of the observed arrival time signals displayed in the data window and from a user-selected trial location of the event selected in the base map window. The program enables user-repositioning of the trial location in the base map window such that the displayed curve moves in correspondence with the repositioning of the trial location. The trial location is repositioned until an acceptable visual coincidence of the curve is reached with the observed arrival time signals of the traces to thereby yield the location of the event. The program includes a pick-mode technique to refine the location of the event and a polarization analysis to remove ambiguity in the location of the event when more than one solution is possible.

30 Claims, 17 Drawing Sheets

OTHER PUBLICATIONS

Fix, James E., et al., "Application of Microseismic Technology in a Devonian Shale Well in the Appalachian Basin," *SPE 23425,* SPE Regional Meeting, Lexington, KY, Oct. 22–25, 1991.

Hanson, M. E., et al., "Design, Execution, and Analysis of a Stimulation to Produce Gas from Thin Multiple Coal Seams," *SPE 16860,* 62nd Annual Conf. of the SPE, Dallas, TX, Sep. 27–30, 1987.

Mahrer, Kenneth D., "An Empirical Study of Instability and Improvement of Absorbing Boundary Conditions for the Elastic Wave Equation," *Geophysics,* 51:7, 1499–1501, Jul. 1986.

Vinegar, H.J., "Active and Passive Seismic Imaging of a Hydraulic Fracture in Diatomite," Society of Petroleum Engineers, pp. 913–925.

"Hydraulic Fracture Diagnostic Research," Gas Research Institute, Dec. 1989–Dec. 1990.

Mahrer, Kenneth D., "Hydraulic Fracture Height in Cased Wells," *Geoexploration,* 28 (1991), 221–250.

Mahrer, Kenneth D., "Microseismic Logging: A New Hydraulic Fracture Diagnostic Method," *SPE 21824,* Rocky Mountain Regional Mtg. and Symposium, Denver, CO, Apr. 15–17, 1991.

Mahrer, Kenneth D., et al., "Seismic Wave Motion for a New Model of Hydraulic Fracture With an Induced Low–Velocity Zone," *J. Geophysical Resarch,* 92:B9, 9293–9309, Aug. 10, 1987.

Majer, E. L., "The Application of High Frequency Seismic Monitoring Methods for the Mapping of Grout Injections," *Int. J. Rock Mech. Min. Sci. & Geomech. Abstr.,* 26:3/4, 249–256, 1989.

Mauk, F. J., et al., "Monitoring Hydraulic Fracture Stimulations With Long–Period Seismometers to Extract Induced Fracture Geometry," *SPE 15214,* SPE Symposium, Louisville, KY, May 18–21, 1986.

McEvilly, T. V., et al., "ASP: An Automated Seismic Processor for Microearthquake Networks," *Bulletin of the Seismological Society of Amer.,* 72:1, 303–325, Feb. 1982.

Smith, M. B., et al., "A Comprehensive Fracture Diagnostics Experiment: Part II—Comparison of Seven Fracture Azimuth Measurements," *SPE/DOE 13894,* SPE/DOE Denver, CO, May 19–22, 1985.

Sorrells, G. G., et al., "Advances in the Microseismic Method of Hydraulic Fracture Azimuth Estimation," *SPE 15216,* SPE Symposium Louisville, KY, May 18–21, 1986.

Withers, Robert, "System And Method For Determining Earth Fracture Propagation," U.S. Patent Application, pp. 1–32, 11 sheets of darwings, no date or Serial No.

Vinegar, H. J., et al., "Active and Passive Seismic Imaging of a Hydraulic Fracture in Diatomite," *J. Petroleum Engineers,* p. 28, Jan. 1992.

Wills, D. C., "Active and Passive Imaging of Hydraulic Fractures," *Geophysics: The Leading Edge of Exploration,* p. 15, Jul. 1992.

EVENT LOCATION PROGRAM (FRACVIEW)

2102

| STATION/CHANNEL | P-ARRIVAL | | S-ARRIVAL | | P/S-COMPUTED | |
|---|---|---|---|---|---|---|
| 1001(rid= 1:tid= 1) | 0.253 | (−0.882) | 0.352 | (−2.150) | −1.135 | −2.502 |
| 1002(rid= 2:tid= 2) | 0.253 | (−0.882) | 0.352 | (−2.150) | −1.135 | −2.502 |
| 1003(rid= 3:tid= 3) | 0.253 | (−0.882) | 0.352 | (−2.150) | −1.135 | −2.502 |
| 1004(rid= 4:tid= 4) | 0.250 | (−0.889) | 0.344 | (−2.166) | −1.139 | −2.510 |
| 1005(rid= 5:tid= 5) | 0.250 | (−0.889) | 0.344 | (−2.166) | −1.139 | −2.510 |
| 1006(rid= 6:tid= 6) | 0.250 | (−0.889) | 0.344 | (−2.166) | −1.139 | −2.510 |
| 1007(rid= 7:tid= 7) | 0.247 | (−0.897) | 0.337 | (−2.182) | −1.143 | −2.519 |
| 1008(rid= 8:tid= 8) | 0.247 | (−0.897) | 0.337 | (−2.182) | −1.143 | −2.519 |
| 1009(rid= 9:tid= 9) | 0.247 | (−0.897) | 0.337 | (−2.182) | −1.143 | −2.519 |
| 1010(rid=10:tid=10) | 0.243 | (−0.904) | 0.330 | (−2.198) | −1.147 | −2.527 |
| 1011(rid=11:tid=11) | 0.243 | (−0.904) | 0.330 | (−2.198) | −1.147 | −2.527 |
| 1012(rid=12:tid=12) | 0.243 | (−0.904) | 0.330 | (−2.198) | −1.147 | −2.527 |
| 1013(rid=13:tid=13) | 0.240 | (−0.911) | 0.322 | (−2.213) | −1.151 | −2.536 |
| 1014(rid=14:tid=14) | 0.240 | (−0.911) | 0.322 | (−2.213) | −1.151 | −2.536 |
| 1015(rid=15:tid=15) | 0.240 | (−0.911) | 0.322 | (−2.213) | −1.151 | −2.536 |
| 1016(rid=16:tid=16) | 0.237 | (−0.918) | 0.315 | (−2.229) | −1.155 | −2.544 |
| ⋮ | ⋮ | | ⋮ | | ⋮ | |
| SS_239(rid=239:tid= 0) | 0.768 | ( 0.768) | 1.486 | ( 1.486) | 0.000 | 0.000 |
| SS_240(rid=240:tid= 0) | 0.769 | ( 0.769) | 1.488 | ( 1.488) | 0.000 | 0.000 |
| SS_241(rid=241:tid= 0) | 0.770 | ( 0.770) | 1.491 | ( 1.491) | 0.000 | 0.000 |
| SS_242(rid=242:tid= 0) | 0.771 | ( 0.771) | 1.493 | ( 1.493) | 0.000 | 0.000 |
| SS_243(rid=243:tid= 0) | 0.773 | ( 0.773) | 1.496 | ( 1.496) | 0.000 | 0.000 |
| SS_244(rid=244:tid= 0) | 0.774 | ( 0.774) | 1.499 | ( 1.499) | 0.000 | 0.000 |
| SS_245(rid=245:tid= 0) | 0.775 | ( 0.775) | 1.501 | ( 1.501) | 0.000 | 0.000 |
| SS_246(rid=246:tid= 0) | 0.776 | ( 0.776) | 1.504 | ( 1.504) | 0.000 | 0.000 |

EVENT LOCATION ASSIGNED A QUALITY OF 5
 (1−4=BEST−WORST: 5=SOLUTION DID NOT CONVERGE)

Fig. 21

SYSTEM AND PROGRAM FOR LOCATING SEISMIC EVENTS DURING EARTH FRACTURE PROPAGATION

CROSS REFERENCE TO RELATED APPLICATION

This application is a continuation-in-part of copending U.S. application Ser. No. 08/196,621 filed Feb. 14, 1994, assigned to the assignee of the present application.

BACKGROUND OF THE INVENTION

The present invention pertains generally to a system for detecting, recording and analyzing seismic events, e.g., "micro-earthquakes," caused by the propagation of hydraulic fractures occuring when fluid or slurried solid waste materials are injected into an earth formation zone through an injection well, so that the fracture propagation may be controlled. More specifically, the invention pertains to a computer program for quickly and accurately locating the seismic events that occur during such earth fracture propagation.

Hydraulic fracturing of certain zones of earth formations is a now commonly used method to stimulate the production of hydrocarbon fluids, for example. More recently, it has been proposed to dispose of certain fluids or slurried solid waste materials into certain zones of earth formations which will contain these materials by hydraulically fracturing the zone to a predetermined extent to at least partially provide space for disposal of such waste material. However, a longstanding problem in causing hydraulic fractures is determination of the lateral, as well as the vertical, extent or growth of the fracture away from the point of fracture origination, typically a fluid injection well. In particular, the geometry of hydraulic fractures created by the injection of waste materials into a formation zone of interest is critical to avoid causing the injected material to flow beyond predetermined boundaries and contaminate aquifers or other paths which may lead the waste material into unwanted areas. It is also desirable to measure the growth or propagation of hydraulic fractures to properly control the production of fluids from formation zones of interest.

An important consideration in monitoring the propagation of hydraulic fractures is determination of the fracture boundaries, including the radial extent of the fracture from an injection well on a real-time basis. This allows, for example, the injection of liquid and slurried solids waste materials into an earth formation to be controlled to prevent deposition of the materials in unwanted zones. Certain governmental authorities have jurisdiction over what earth formations and zones of certain earth formations may receive waste materials. The accurate determination of the propagation of a hydraulic fracture on a real-time basis is thus of considerable importance.

Although the detection of seismic events such as micro-earthquakes and the like is a relatively developed art, there has been a need to provide a system and method for measuring certain micro-earthquake events, such as those caused by the propagation of hydraulic fractures, to separate the actual event indicating propagation of a fracture from other acoustic noise in the formation, such as fluid flow generated noise and surface transmitted noise from machinery and the like. Accordingly, the process of gathering large amounts of data generated during the extension of hydraulic fractures, and the rapid analysis and display of such data in a meaningful way to indicate the location of an event which is part of a fracture propagation process, is of utmost importance to such endeavors as the disposal of slurried solids wastes and other fluid wastes through subterranean injection wells.

Moreover, heretofore there has been no direct ability to monitor the growth of hydraulically induced fractures during such growth, and the extent of fracture length, height, width and growth rate have been assumed from prefracture computations for a predetermined set of characteristics of the earth formation in which the fracture is induced. These fracture models have not always been sufficiently accurate and the ability to actually measure the lateral as well as vertical growth of a hydraulic fracture has been a long-sought goal. An article entitled "Active and Passive Imaging of Hydraulic Fractures" by P. B. Willis, et al., *Geophysics: The Leading Edge of Exploration*, July 1992, describes a system for monitoring the growth of hydraulic fractures from one or more instrumented monitor wells wherein the seismic events are measured by geophones and the resultant geophone signals are later subjected to signal analysis. An article entitled "The Application of High Frequency Seismic Monitoring Methods for the Mapping of Grout Injections" by E. L. Majer, *The International Journal of Rock Mechanics, Mining Science and Geomechanics*, Vol. 26, Nos. 3 and 4, pages 249–256, 1989, discusses a real-time monitoring system wherein digital data at sample rates greater than 50,000 samples per second are required to capture the necessary data. A sixteen channel system digitizes the data at up to 100,000 samples per second on each channel, saves the waveform, picks p-wave times, locates the events and plots the results in "close to real time using 3-D color graphics."

Thus it is recognized that increased speed in accurately locating seismic events in three-dimensions can be achieved by interactively picking the arrival time of the compressional (P) and shear (S) phases of the seismic record at each detector location. For example, a computer program available from Los Alamos National Laboratories can be modified so that a least-squared location is determinable for each of the seismic events. For the large events this process is relatively rapid, taking only a few minutes with the aid of automated phase picking of arrival times. However, for smaller events with low signal-to-noise ratio, when a large number of channels are used, the process can take several hours and require an interpreter, such as a skilled engineer, experienced in phase identification to achieve accurate results.

Therefore, what is needed is an improved system and method for determining the extent and location of hydraulic fractures propagated in earth formations, particularly, but not limited to, those fractures caused by the injection of fluids through an injection well for waste disposal.

There is further a need for a computer program to be utilized with such a system that increases the accuracy of, and reduces the turnaround time for, locating seismic events of small magnitude. Such a program would, for example, permit regulatory monitoring of fracture growth during fluid injection in sufficient time to impact the injection process.

SUMMARY OF THE INVENTION

The present invention provides a unique system and computer program for determining the location of seismic events caused by hydraulic fractures propagated in earth formations. The program provides fast turn around time and accuracy in locating the seismic events, particularly those of low signal-to-noise ratio.

Generally, a system is provided for monitoring the extension of hydraulic fractures in earth formations from a fluid injection well, for example, wherein acoustic signals, generated and propagated through the earth formation by the seismic events caused by growth of the fracture, are recorded and transmitted to a processing system for display and analysis. A pattern of signals may be observed to detect the location of the fracture extension or propagation, and the shape of the fracture. The system thus permits the real-time control of fracture growth such as in the process of injecting fluidized wastes into certain earth formation zones.

The location of significant events indicating the propagation of a fracture are calculated and displayed on a three-dimensional display of an injection well and monitor wells, if any, and the surrounding geology. The display of the seismic events may indicate the accuracy of the location and predetermined limits to the accuracy of the location. The display may be supplemented with engineering data extracted through one or more computers monitoring the injection process. For example, the engineering data may include, but not be limited to, the fluid injection pressure into the injection well and the fluid injection rate.

In one aspect, the invention is directed to a computer program for determining the location of a seismic event in an earth formation zone using seismic traces corresponding to the event collected from one or more sensors in the zone, the program being stored on a computer-readable media for operation by a user on a computer having a graphical user interface. The program displays a graphical data window of the seismic traces corresponding to the event, the traces representing observed arrival time signals from the sensors plotted with respect to time. A window of a base map of the positions of the one or more sensors within the zone is also displayed. Also displayed in the graphical data window is a curve plotting calculated arrival time signals for the traces, the curve being developed from a user-selected one of the observed arrival time signals displayed in the graphical data window and from a user-selected trial location of the event selected in the base map window. The program enables user-repositioning of the trial location in the base map window such that the displayed calculated arrival-time curve moves in correspondence with the repositioning of the trial location. The trial location is repositioned by the user until an acceptable visual coincidence of the curve is reached with the observed arrival time signals of the traces to thereby yield the location of the event. In refinements to the foregoing, mathematical algorithms to help with the quality of the decision, such as correlation and semblance over the data traces, may be implemented. The velocity model from the earth used in the calculation is stored in a database such that it may readily be modified if the data indicates a change in the velocity model values or details is justified.

The program also allows for refining the location of the event using a pick mode technique. First, the calculated arrival time curve is displayed as timing marks so that each timing mark corresponds to one of the traces and represents the calculated arrival time signal for the corresponding trace. The user respositions selected ones of the timing marks after which the program performs a functional analysis on the calculated arrival time signals to yield a refined location of the event. The program also includes a polarization analysis to remove ambiguity in the location of the seismic event when more than one solution is possible, typically caused when only a limited number or distribution of earth sensors are used.

Advantages of the present invention include providing for changing hydraulic fracture characteristics of length, height and width as well as growth rate by altering the pressure and rate of the injection process. In particular, the invention provides for monitoring the growth of the fracture height to prevent the fracture from exceeding a design height or from unwanted breakthrough into a particular water, oil or gas-bearing formation zone, for example. There are significant environmental and regulatory implications to controlling the growth of fractures which contain waste materials.

Still further, the invention provides for identifying earth formation zones wherein significant stress contrast and strength variations in the earth formation away from the injection well may cause changes from a predicted extension or direction of growth of a hydraulically induced fracture. It reduces the location time from several hours to tens of minutes without loss of accuracy and improved ability to locate small events. Small events may be the result of the fracture event being far away. Therefore, the invention provides the potential for increased location range.

Advantages of the event location program are that it is user friendly, and minimal training is needed for operators who are only using map location arrival time curve matching, as this procedure requires very little experience in phase identification. The trial event location solution obtained from the map location arrival time curve matching technique aids greatly in phase identification when subsequent manual picking is required. It is further useful in locating small events with low signal-to-noise ratio where identification of discrete phases is almost impossible on individual traces but are recognizable from a pattern on a series of multiple adjacent traces.

BRIEF DESCRIPTION OF THE DRAWINGS

FIGS. 16–23 are representative screen displays showing the operation of the the seismic event location program of FIG. 1 corresponding to the operation described in FIG. 15.

DETAILED DESCRIPTION OF THE PREFERRED EMBODIMENTS

Figure 1:
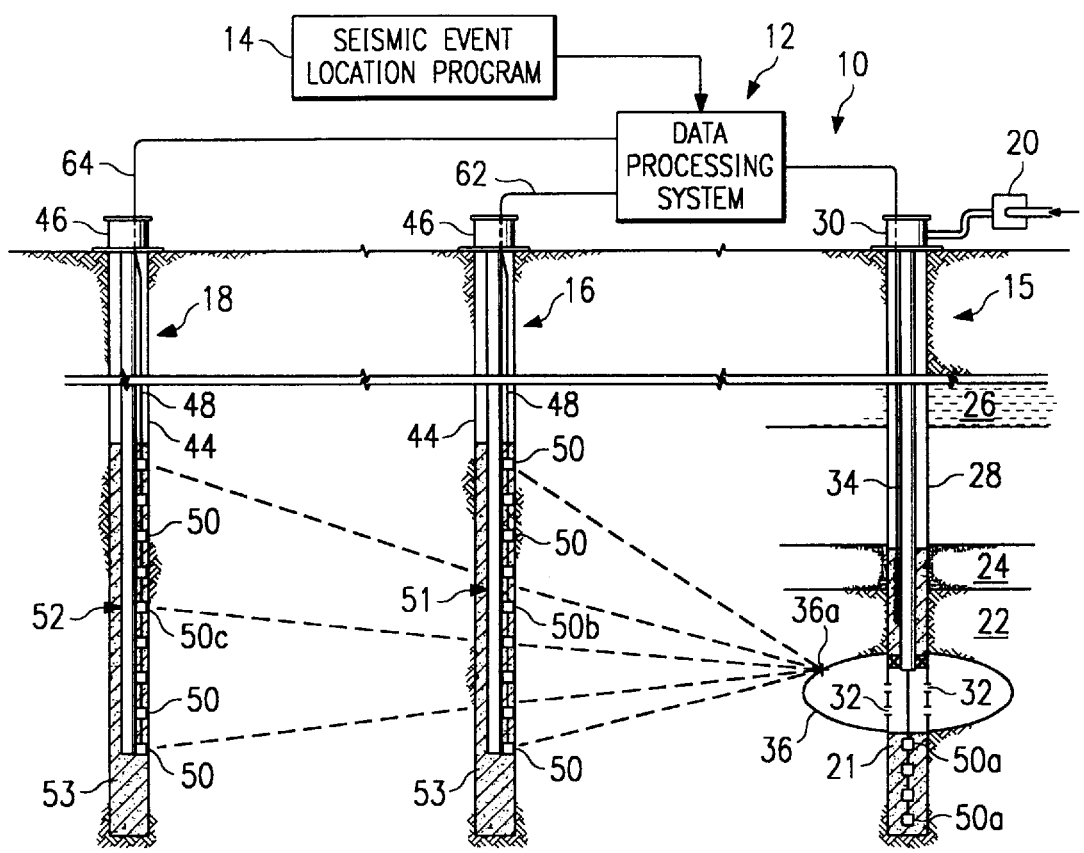
FIG. 1 is a schematic diagram showing a waste injection well and two instrumented monitoring wells in accordance with the present invention.
Figure 2:
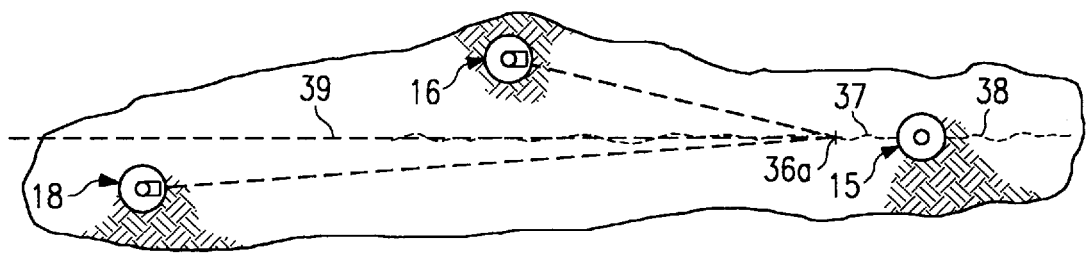
FIG. 2 is a plan view of the diagram of FIG. 1.

In FIGS. 1 and 2 the reference numeral 10 refers, in general, to a system for monitoring and controlling the propagation of hydraulically induced earth fractures. The system 10 has a data processing system 12 that includes a unique graphical display computer program 14 for quickly and accurately locating seismic events generated by the fractures. The seismic event location program 14 is described generally in an overview of the system 10 with reference to FIG. 4 (i.e., the program 14 designated as "FasTrak"), and is subsequently described in detail with reference to FIGS. 15–23.

SYSTEM OVERVIEW

Figure 3:
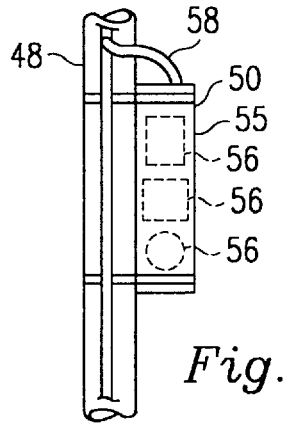
FIG. 3 is a detail view showing certain basic features of a geophone unit used with the geophone arrays disposed in the monitoring wells.

Referring to FIGS. 1–3, the system 10 includes the data processing system 12 which is connected to a well 15 and one or more monitoring wells 16 and 18. An injection system 20 is connected to the well 15 for the disposal of certain liquid wastes and slurried particulate solids into the earth. It is understood that the injection well 15 extends into an earth formation zone 22 which, for example, is predetermined to have an in situ stress which may be less than the in situ stress of a zone 24 lying above the zone 22. In this way, there is some assurance that a hydraulically induced fracture extending from the well 15 will not break out into the zone 24 or into an aquifer 26, for example, lying above the zone 24. In any event, the disposal of certain wastes into subterranean earth formations must controlled so that the wastes are contained within a predetermined formation zone and are not allowed to migrate into zones which might be tapped for the production of certain fluids or from which the wastes might otherwise migrate.

The well 15 includes a conventional tubular casing 28 extending from a conventional well head 30. An open hole portion 21 of the well extends below the casing 28 and the casing is perforated at 32 to allow fluids to be pumped into the well through a tubing string 34, for example, to exit the well through the perforations 32 and initiate a hydraulic fracture 36. The fracture 36, which is exemplary, is illustrated as a classic two-winged, vertically- and radially-extending hydraulically induced fracture. The radial propagation of "wings" 37 and 38 of the fracture 36 away from the well 15 is assumed to lie substantially in a plane which is normal to the minimum in situ compressive stress in the formation zone 22. The term "fracture" as used herein is not limited to the exemplary fracture 36, but may also include a type of fracture wherein the principal horizontal stresses are equal or unequal. In these situations fracture "networks" may develop which have either a circular or somewhat elliptical envelope when viewed in a horizontal plane. Still further, "fractures" may take the form of a zone of so-called disaggregated earth material.

FIG. 2 illustrates the fracture wings 37 and 38 extending away from the well 15 in opposite directions and along a line or azimuth 39 defining the assumed fracture extension plane. The stress field in the formation zone 22 may be such that the fracture extends in other directions or may, in fact, be a substantially horizontally-extending fracture. However, the formation zone 22 may be selected to be such that the stress field is fairly uniform and provides for the propagation of the fracture 36 in a conventional manner as the classic two-winged, vertically- and radially-extending fracture. Predetermination of the orientation of the fracture plane 39 may be carried out using conventional stress field determination techniques such as oriented cores, impression packers and tilt meters, for example. Predetermination of the orientation of the assumed fracture plane defined by the line 39 is useful, although not mandatory, with regard to the method of the present invention.

Each of the wells 16 and 18, as illustrated, are provided with a conventional metal casing 44 and a wellhead 46, although the casing may not be required in all instances. Each of the monitor wells 16 and 18 is also shown with an elongated tubing string 48 extending within the well from the wellhead 46 and functioning as a support for an array of vertically spaced-apart sensors comprising, for example, geophone units 50. Other arrangements are also contemplated, such as a deployment of sensors with the weight carried by the cable or an additional stress cable, thus avoiding the tubing costs. As illustrated, respective arrays 51 and 52 of geophone sensor units 50 are disposed such that they are spaced above and below the expected vertical boundaries of the hydraulic fracture 36. In order to enhance the acoustic coupling of the formation zone 22 to the geophone units 50, each wellbore of the wells 16 and 18 is filled with a quantity of cement 53 after the geophone arrays are placed in their working positions. The geophone units 50 may, for example, comprise plural 30 Hz broad band type sensors 56, such as a type SM-11, available from Sensor, Inc., Houston, Tex., arranged in pods or containers 55, FIG. 3. Each of the pods 55 comprises three orthogonally-arranged sensors 56 disposed to provide one vertical and two horizontal event-sensing and signal-transmitting channels. Seismic signals generated by the sensors 56 are transmitted via suitable conductor means 58 to the surface and to the data processing system 12 (FIG. 1). The sensors 56 may also comprise accelerometers or hydrophones, for example.

By way of example, the injection well 15 may be characterized by 8.625inch diameter surface casing and 2.875 inch diameter tubing 34 for injecting the waste materials into the fracture 36. A real-time bottom hole pressure gauge, not shown, is preferably installed in the wellbore portion 21 adjacent the perforations 32. Alternatively, an array of geophones may also be disposed in the injection well 15 near, above or below, the perforations 32. An exemplary location is shown in FIG. 1 wherein geophone units 50a are disposed in an open hole portion 21 of the injection well 15 below the perforations 32.

The monitor wells 16 and 18, by way of example, may also have casing diameters similar to that of the injection well. The spacing of the monitor wells 16, 18 from the injection well 15 may be on the order of 80 to 150 feet and 700 to 1000 feet, respectively. The spacing of the geophone units 50 arranged in pods 55 may be in the range of 20 to 30 feet along the support tubings 48. The vertical coverage of the geophones may be predetermined in accordance with the expected vertical growth of the fracture 36 and the range and wavelength of the recorded signals. Vertical coverage or extent of the geophone arrays 51 and 52 may be on the order of 750 feet, for example.

Other geophone arrays may be employed, including the placement of oriented arrays of accelerometer or hydrophone sensors on the outer surfaces of the casings 44, for example. Moreover, the arrangement of the monitor wells 16 and 18 may include a third well (not shown) with an accelerometer or geophone type sensor array disposed therein for a more accurate determination of the propagation and geometry of the fracture 36 including the thickness of the fracture and the overall height. However, those skilled in the art will recognize that the cost of the fracture monitoring system 10 is directly proportional to the number of monitor wells (e.g., wells 16, 18) provided and a reasonably accurate determination of the geometry of the fracture 36 may be obtained using one or more instrumented wells.

If height is a principal concern, and it usually is, a single monitor well may be used. Polarization analysis of the various geophone pods can lead to a unique solution.

Significant seismic activity has been observed in connection with the extension of hydraulic fractures in various earth formations. The extension of hydraulic fractures resulting from the injection of fluids into a formation zone occurs in multiple relatively small extensions or "jumps," each of which causes a micro-earthquake. If discrete, localized micro-earthquakes occur as the fracture extends away from a wellbore, both laterally (radially) and vertically, the amplitude of the seismic wave generated by these activities will typically be significant enough to be observed at locations remote from the fracture itself. Accordingly, by sensing and recording the seismic activity resulting from hydraulic fracture extension at various depths in one or more positions with respect to the fracture extension, this seismic activity can be used to determine the position of the micro-earthquake and, hence, the geometry of the fracture and its location.

In order to have a meaningful quantity of information to determine the location and geometry of a fracture, a substantial number of seismic signals must be continuously recorded from several stations over a period of time. For example, by recording compressional or so-called P waves, as well as shear or so-called S waves, in conjunction with arrival times, an estimate of event locations may be provided using known seismic or earthquake monitoring methodology including a determination of the compressional and shear wave velocities of the formation in question. Moreover, the seismic activity resulting from hydraulic fracture extension must be discerned from "background noise" associated with signals generated by fluid movement through the injection well 15 and within the existing portions of the fracture itself.

Problems associated with the injection of waste materials into a subterranean formation arise if the propagation of the fracture cannot be monitored closely as this event occurs. In other words, if seismic activity is recorded and analyzed at a later time, the fracture may have extended out of the predetermined boundaries prescribed for the injection process. Accordingly, it is important to be able to closely monitor fracture extension or propagation with minimal time delay so that action can be taken to cease or reduce fluid injection, for example, if fracture extension is indicated to be in a direction which might result in uncontrolled flow of the injection material into an unwanted zone. It is to this end, in particular, that the present invention is directed to provide real-time monitoring of fracture propagation which includes the treatment of a significant number of signals received from the geophone arrays 51, 52 described and illustrated herein.

DATA PROCESSING SYSTEM

Figure 4:
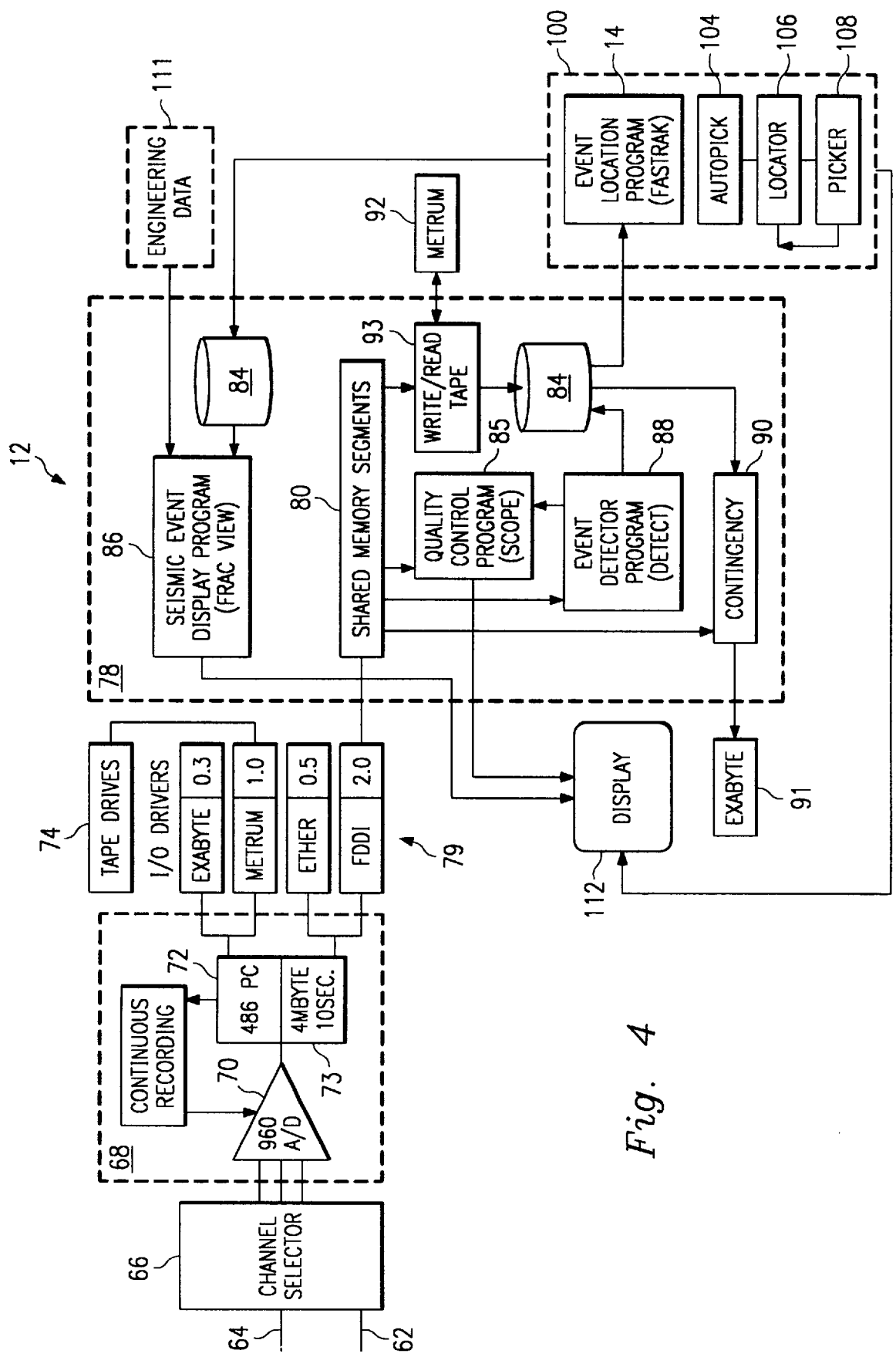
FIG. 4 is a schematic block diagram showing major components of the data recording and processing system of the present invention.

Referring also to FIG. 4, signal carrying conductors 62 and 64 from each of the geophone arrays 51 and 52 extend from the respective well-heads 46 to the data processing system 12. FIG. 4 illustrates components of the system 12 sufficient to understand the present invention when read in conjunction with the rest of the specification, it being understood that a description of many conventional aspects of the system 12 are omitted for clarity. It is understood, for example, that the system 12 includes suitable processors and memory to implement the functions and store the various computer programs and data subsequently described.

The data processing system 12 includes a suitable connector panel and channel selector 66 for connecting the individual conductor wires of the cabled conductors 62 and 64 to a data recording computer 68 which includes an analog to digital converter 70 and a central processing unit (CPU) 72. The channel selector 66 may be configured to permit transmission of analog signals from selected ones of the geophone sensors 56 of each geophone pod to the converter 70. The analog signals directed to the converter 70 are irregular wave signals having a variable amplitude as a function of time. The converter 70 is adapted to continuously acquire signals from the geophone arrays 51 and 52, convert these signals to digital format and transmit the signals to the CPU 72 for further treatment. The CPU 72 is operable to be in communication with a suitable recording tape disposed in a storage device on tape recorder 74 for receiving the continuously converted and recorded data representing the seismic event signals. The tape recorder 74 may be of a type manufactured by Metrum Information Storage of Denver, Colo. as their Model RSP-2150, or Parity Systems, Inc. of Los Gatos, Calif. as their Model Exabyte 8500. The CPU 72 is provided with suitable input/output driver programs and data storage (e.g., Exabyte and Metrum) to transmit the data to the tape recorders 74.

Alternatively, the continuously recorded data representing the geophone signals may be transmitted via the buffer 73 and the network 79 having a selected input/output driver links (e.g., Ethernet or FDDI) for transfer to a second computer 78. The computer 78 includes a ninety six megabyte random access memory 80 operable to receive data from the computer 68 via the network 79 (i.e., via the Ethernet or FDDP data link). The network 79 input/output driver programs may reside on the CPU 72 for transmitting data to the memory 80.

The computer 78 includes a suitable disk type data storage device 84 and processor capacity for storing and operating a graphical display computer program 86 (designated as FracView), a seismic display and quality control program 85 designated Scope, an event detector program 88 designated Detect and a contingency program 90. It is understood that data from the contingency program 90 may be stored in a memory (not shown) via a network or a tape storage device 91, e.g., Exabyte. A second tape recorder 92 is also operable to receive suitably acquired and organized data segments from the memory 80 as will be described in further detail herein.

The Detect program 88 is operable to identify seismic events of a particular characteristic and transfer the signal data from the selected event to the storage disk 84. A third computer or central processing unit 100 (possibly multi-tasked with the computer 78) is also be provided with the system 12 and has residing thereon certain programs 14, 104, 106, 108 (described subsequently in detail) for further selecting signals representing seismic events of a particular characteristic and for calculating the location of the selected event. Moreover, the resulting analysis of selected data carried out by the programs 14, 104–108 may be stored on a suitable device such as the disk 84 for use in the FracView display program 86. Certain engineering data 111 may also be transferred to the program 86 such as the rate of pumping of fluid into the injection well and the pressure of the fluid in the vicinity of the perforations 32. The computers or central processing units 68, 78 and 100 may, respectively, be commercially acquired from Oyo Limited of Houston, Tex., as their Model DAS1, Silicon Graphics, Inc., Sunnyvale, Calif., as their Model Indigo 2, and Sun Microsystems, Inc. of Sunnyvale, Calif. as their Model SUN 2. Other possible models include Hewlett Packard Models V743 and HP-E1432A analog to digital converters. A suitable video monitor or display device 112 is also provided and operably connected to the computer 78 for displaying the output of the programs 85, 86, 14 (Scope, FracView and FasTrak). The programs 14, 104–108, 85, 86, 88 are described in further detail with reference to FIG. 10 et seq.

DATA ACQUISITION AND STORAGE

Figure 5:
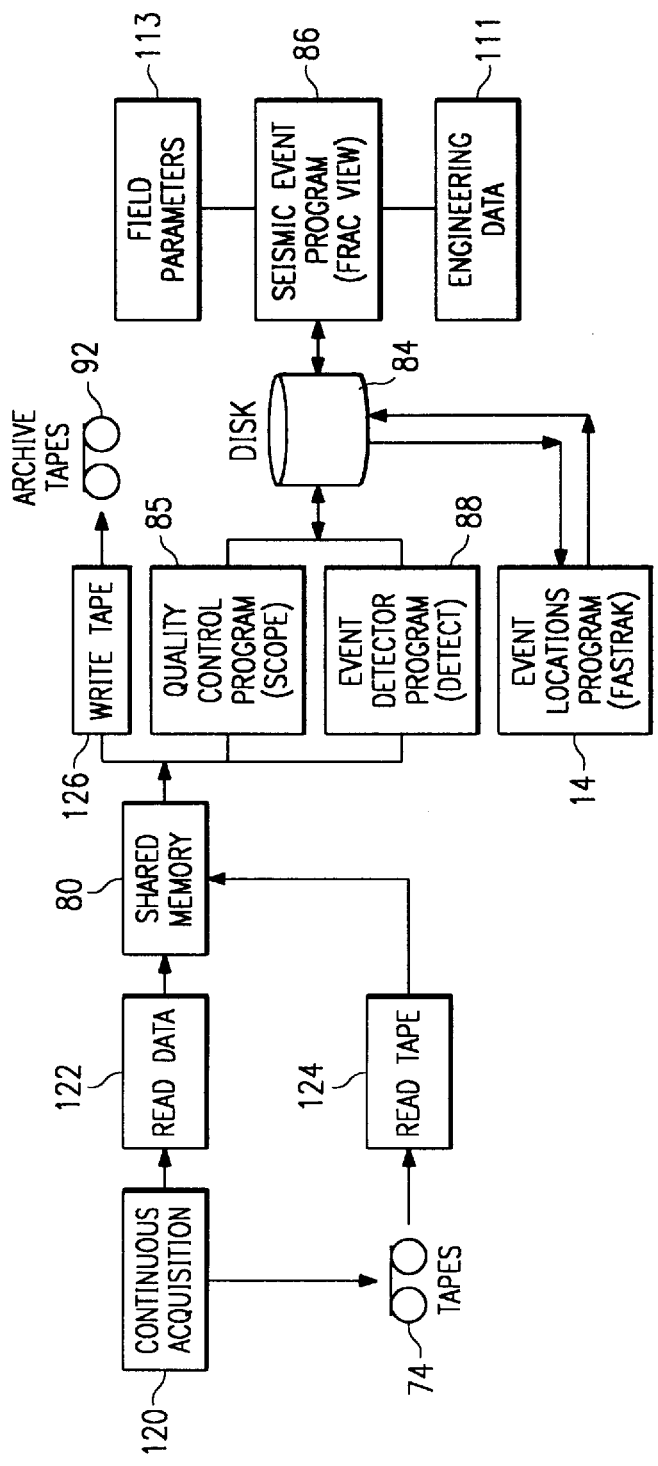
FIG. 5 is a diagram showing steps in the method of recording and analyzing data in accordance with the present invention.

Referring now to FIG. 5, there is illustrated a functional block diagram of the major steps in acquiring and operating on the data transmitted from the monitor wells 16 and 18. The computer or central processing unit 68 is operable to continuously acquire data transmitted by the multiconductor cables 62 and 64 and to prepare the data for transfer to the shared memory 80 and to a backup receiver in the form of the tape on the recorder 74. This process may be carried out by a continuous acquisition program, generally designated by the numeral 120. This program 120 may reside on the CPU 72. The computer 78 is also operable to read the data acquired by the CPU 72 in segments of predetermined duration. For example, when sampling signals from 100 channels at 2000 samples per second data segments of ten seconds duration are obtained. A unique identifier is added to each data segment and the data segment is then transferred to the tape recorder 92 or to the computer 78 for placement in the shared memory 80. The shared memory 80 is operable to read the data storage tape of recorder 74 or to read the data segments directly. Suitable operating programs 122 and 124 may reside on the computer 78 for reading the data from the computer 68 or from the storage tape on recorder 74, respectively. A suitable program 126 may also reside on the computer 78 for transferring data from the shared memory 80 to the archive tapes 92. The quality control program 85 (Scope), the event detecting program 88 (Detect) and the seismic event location program 14 (FasTrak) are utilized to store data on the disk 84 for processing utilizing the display program 86 (FracView) as discussed further below. Inputs to the program 14 may also include the engineering data 111 and field parameters 113.

Figure 6:
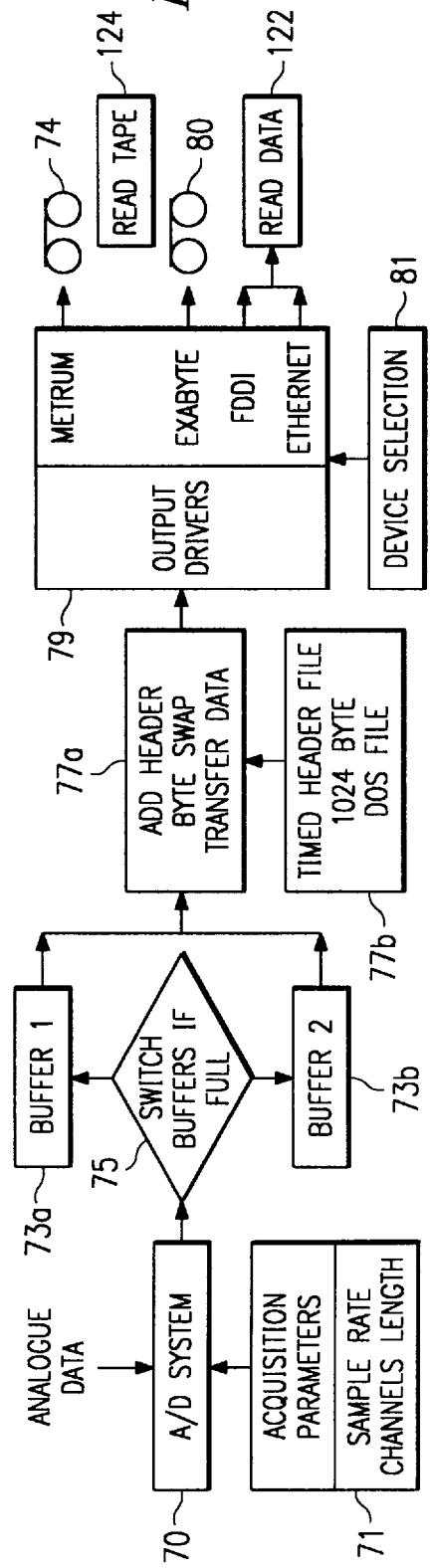
FIG. 6 is a diagram of steps in the method of continuously acquiring data.

Referring now to FIG. 6, there is illustrated a functional diagram showing the primary steps in acquiring data from the geophone arrays 51 and 52 and preparing the data for transfer to the tape on recorder 74 or to the computer 78 for further treatment. The converter 70 may be operated to receive analog data signals from the cables 62 and 64 at a selected sample rate, from a predetermined number of channels or separate geophone sensors, according to certain acquisition parameters and at a predetermined signal length, as indicated by input block 71. For example, as many as 100 separate signals may be received by the converter 70 and converted to digital format at a rate up to 2000 samples per second, 2 bytes per word and data segments of ten seconds duration. The digital data, for example, may be transferred to the buffer 73, which has two buffer devices 73a and 73b, at 0.4 megabytes per second. Data is switched from one buffer device 73a, 73b to the other if one device is already occupied by data, as indicated by decision block 75. Data is transferred from the buffer 73 faster than the data segment length. For example, a ten second segment of data may be called from the buffer 73 and have an identifying header 77a or 77b placed thereon before transfer to either the tape on recorder 74 or to the computer 78 for storage in the shared memory 80. Transfer of data to either the tape recorder 74 or to the computer 78 is preselected as indicated by device selection block 81, and the data transfer is controlled by a driver program 79 associated with the selected one of the recorder 74 or a selected data transfer network 79 connected to the computer 78.

Figure 7:
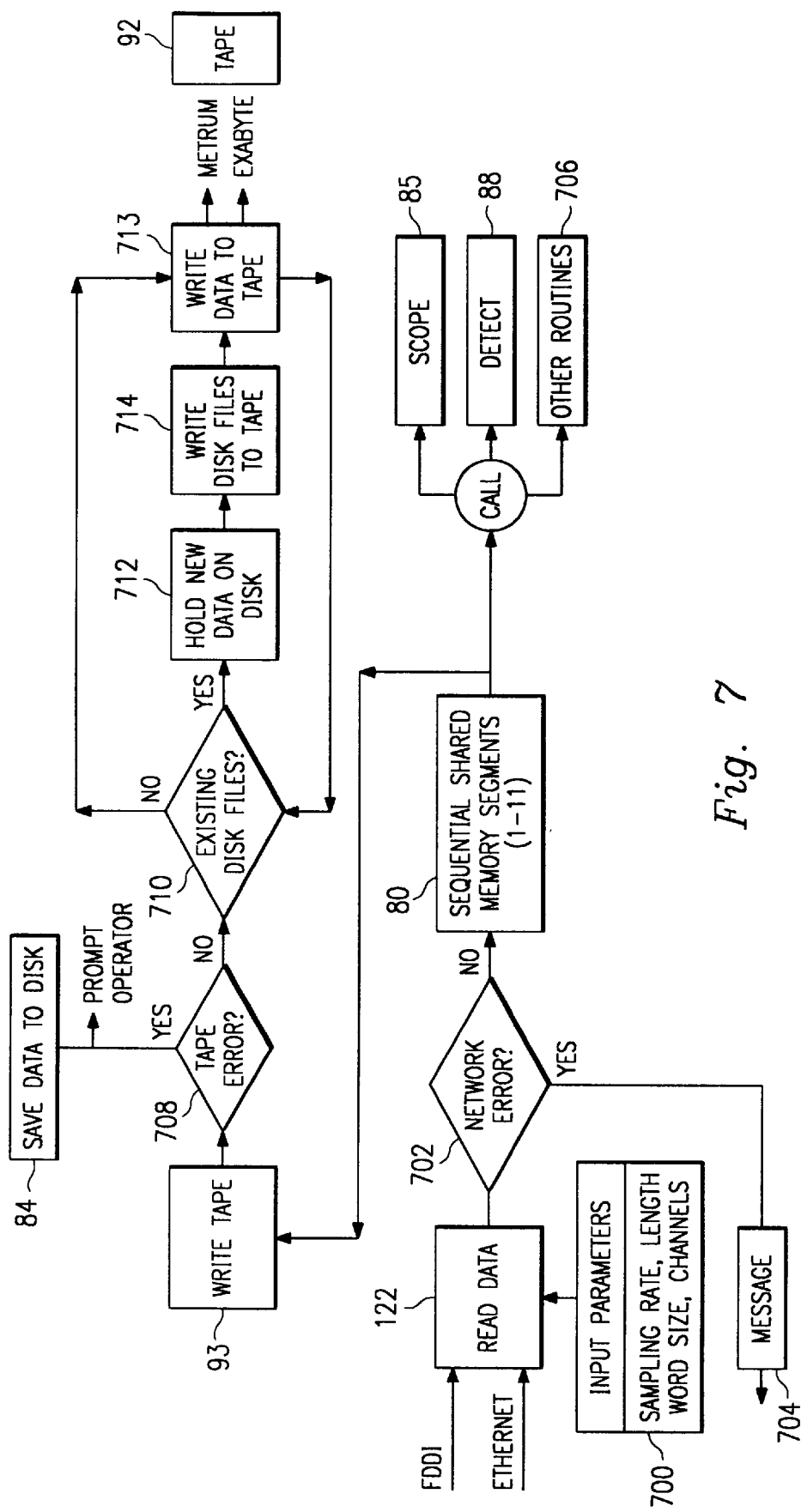
FIG. 7 is a diagram showing steps in the acquisition and recording of data into a shared memory and writing the data to archival tapes.

Referring to FIG. 7 (and FIG. 4), the steps of reading the data generated by the recording computer 68 and the transferring of the data to the shared memory 80 are illustrated. A program (not shown) resides on the computer 78 which is capable of accepting data from the buffer 73 by way of either of the FDDI or Ethernet networks. The sampling rate, word size, number of channels and record length may be further selected and transferred to the acquisition program 80 as indicated by the input parameters block 700. The data is stored in the shared memory 80 in sequential plural segments, a total of eleven, for example, during reading of the data over either of the networks FDDI or Ethernet. If in step 702 a network error is detected, a message 704 may be transferred to the display 112. If there is no error in step 702, data are transferred from the shared memory 80 to an archival tape 92 for storage and may be called for analysis by the programs 85, 88 (Scope or Detect) or any other routines 706 which are capable of being carried out by the computer 78. Data transferred from the shared memory 80 to the archival tape 92 is controlled by the steps illustrated in FIG. 7 and by the Write Tape program 93. If no tape error exists and no preexisting temporary disk files exist as indicated in step 708, data are transferred to the tape 92. If in step 708 a tape error is sensed, an operator prompting signal is provided and all data are temporarily stored on the storage disk 84 until the error is cleared. If in step 708 there is no error, in step 710 a determination is made if preexisting temporary disk files already exist. If not the data is written to tape 92 as shown in step 711. If in step 710 temporary disk files exist, in step 712 the new data are held on the disk and in step 714 written to tape before being transferred to the tape 92. In this way the disk is used as a temporary holding site while tape errors or problems are resolved by the operator, ensuring no loss of data.

Figure 8:
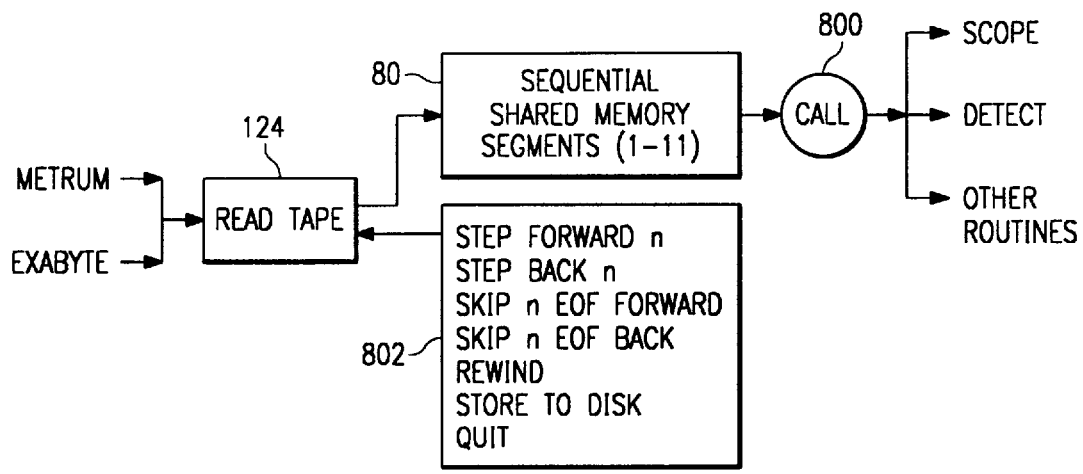
FIG. 8 is a diagram showing the steps in a method of reviewing stored data recorded on a tape medium.

In FIG. 8, it is illustrated that the computer 78 is also operable to call one or the other of the tape recorders 92 to read the data thereon into the shared memory 80, as shown in step 800. A particular segment of data may be called from the recorders 92 by stepping either forward or back a selected number of segments, as indicated by the block 802 describing functions of the Read Tape program 124 (see also FIG. 5).

DISPLAY AND QUALITY CONTROL PROGRAM (SCOPE)

Figure 9:
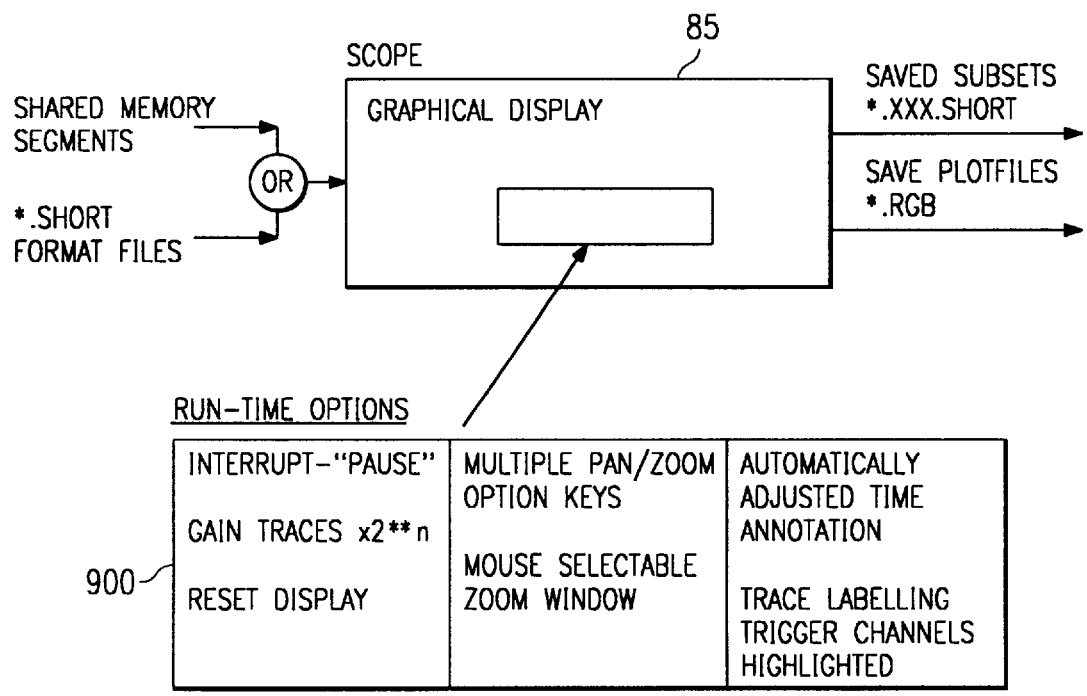
FIG. 9 is a diagram showing features of a method for displaying data acquired and transmitted in accordance with the present invention.

Referring to FIG. 9, the major steps and Run-Time Options 900 available are described for displaying data from each of the geophone signals selected. FIG. 9 describes certain features of the graphical display and quality control program 85 (i.e., Scope). The program 85 is operable to display data segments from the shared memory 80 or from the tape recorder 92, save subsets of the data segments for redisplay and to perform certain operations on the displayed data to enhance its quality, ie., readability.

Figure 10:
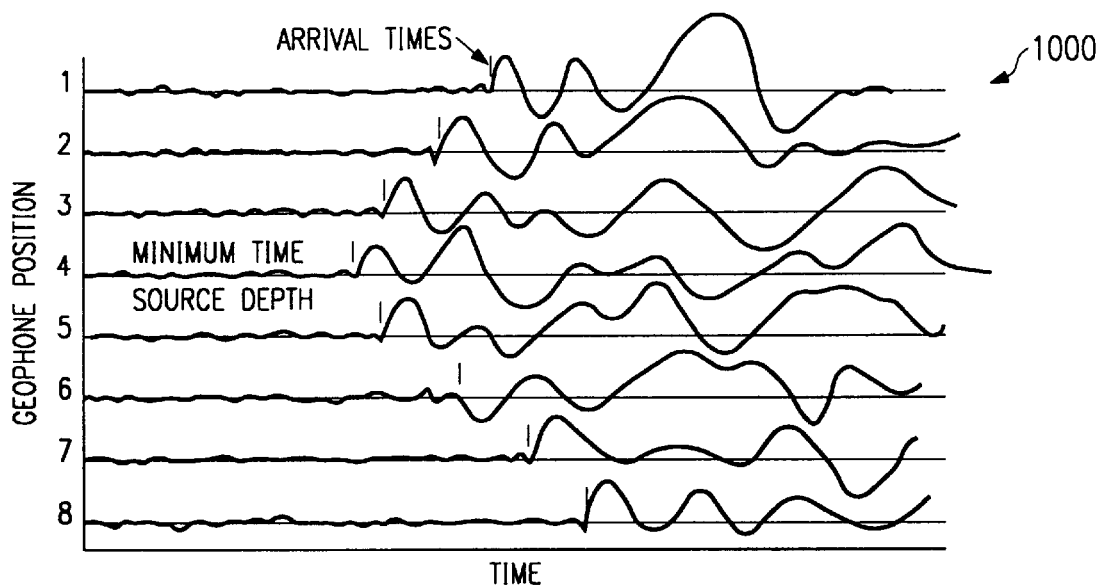
FIG. 10 is a diagram showing a typical display provided for the system and method of the present invention.
Figure 11:
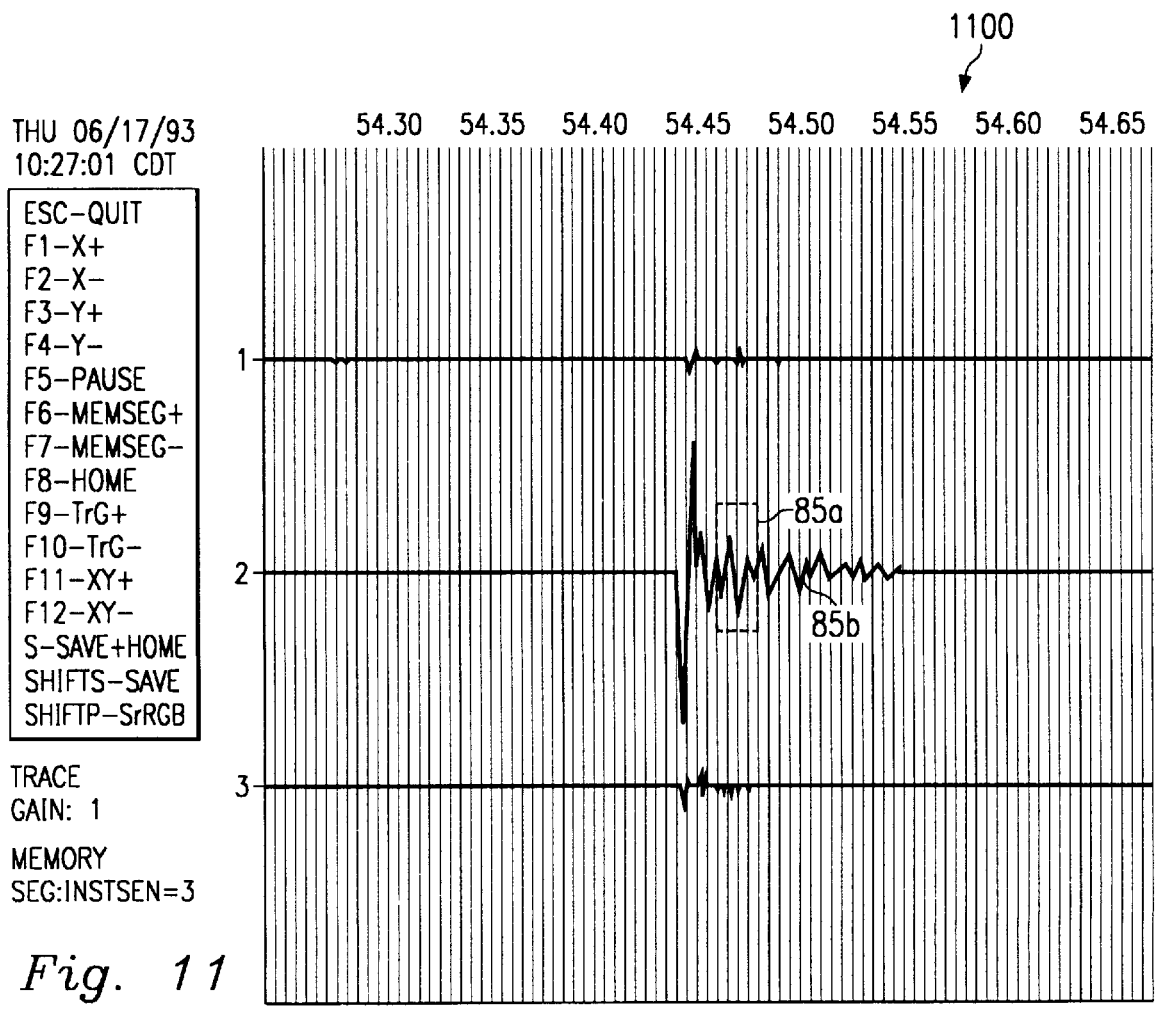
FIG. 11 is a diagram showing another example of a display of the data recorded and analyzed by the present invention.
Figure 18:
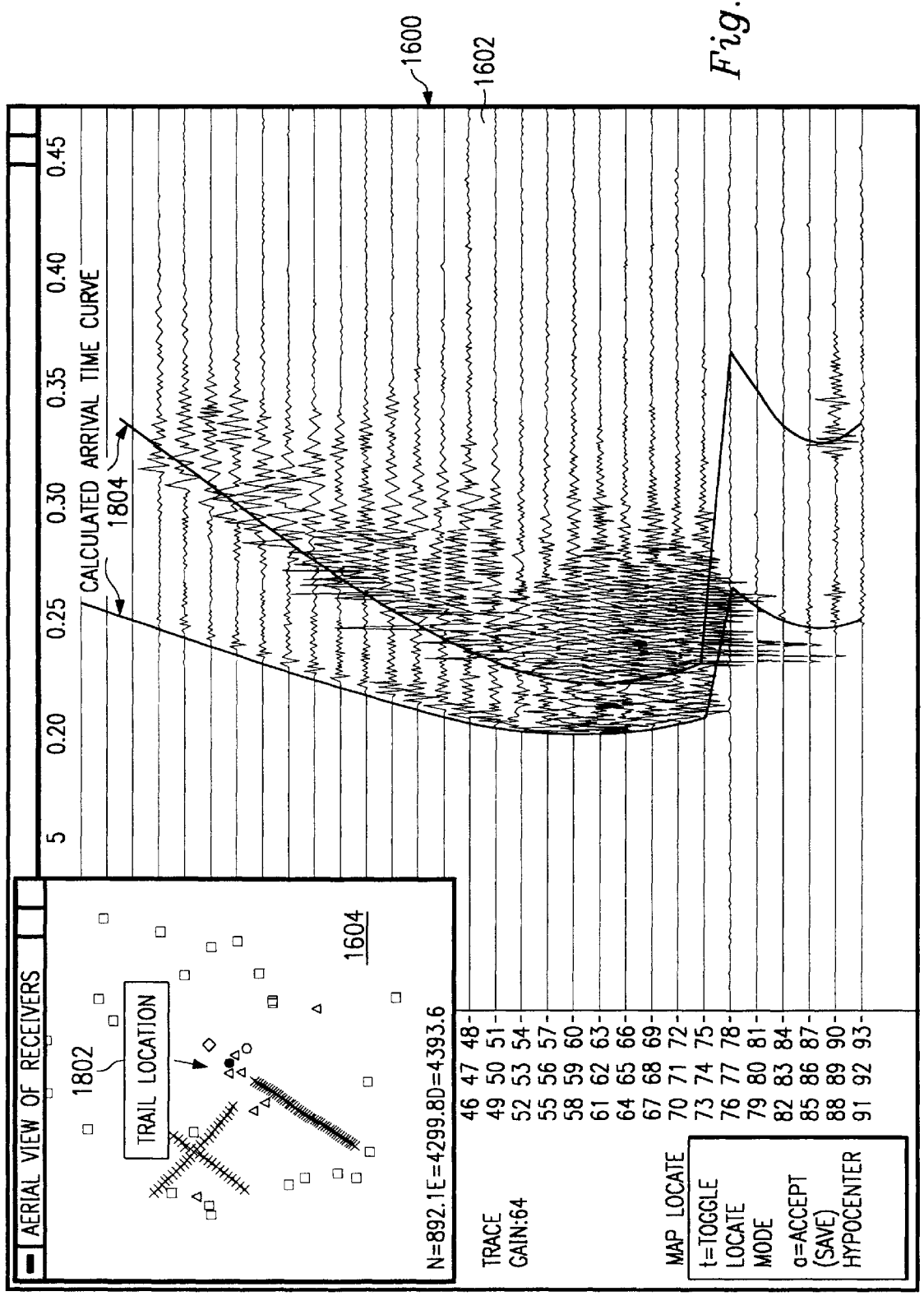

For example, FIGS. 10, 11 and 18 illustrate typical graphical displays of the selected data representing signals from selected geophones and displayed by the Scope program 85. FIG. 10 shows a display 1000 of signals from selected geophones at selected positions 1–8 in the arrays 51 or 52 versus time. The geophone providing a signal of significant magnitude at the earliest time from the onset of the measurement period is indicative of the position of an event which typically represents the extension of the fracture 36. For example, if geophone position number 4 in FIG. 10, at a predetermined position in the array 51 or 52, receives a signal indicating a micro-earthquake before any of the other geophones in the array, this could be correlated with the height of the fracture extension event. Since the position of each of the geophones in the arrays 51 and 52 is known, the geophone receiving a particular seismic signal earlier than any other geophone would indicate the approximate depth of the event, such as a fracture propagation event.

Accordingly, data may be processed by the steps of FIG. 5 and displayed by the Scope program 85 very rapidly with no further analysis to provide real time display of the location (depth) of the outermost edge of a fracture. In this way also, the geophone arrays 51 and 52 are used to sense not only the vertical growth of the fracture but also its lateral or radial growth from the injection well. In regard to the latter determination, since the location of the geophone arrays 51 and 52 is known, and the acoustic velocity of both compressional wave propagation and shear wave propagation can be determined for a particular formation, the position of the fracture growth event from the injection well can also be determined. FIG. 1 illustrates how geophones 50b and 50c in the respective monitor wells 16 and 18 sense the micro-earthquake associated with the extension of the fracture 36 at the point 36a before any of the other geophones in the arrays 51 and 52 receive the seismic signal.

FIG. 11 illustrates another display 1100 that may be obtained with the transmission and manipulation of the data obtained from the shared memory 80 and depicted on the monitor or display 112 by the program 85. The display of FIG. 11 indicates the signals received by the geophones of a particular pod 55 where the geophones or channels are identified by numerals 1, 2 and 3. The irregular wave-type signal illustrated on geophone 2 is of significantly greater amplitude than that received on geophones numbers 1 and 3 from the same event. Knowing the orientation of geophone number 2 with respect to the injection well 15 may be useful in indicating the direction and distance to the event, for example, relative to the location of the geophone location of corresponding traces 1, 2, 3. The display of FIG. 11 is also a display of signal amplitude versus time with the time scale indicated covering approximately 0.50 seconds.

Data operated on by the computer 78 using the Scope program 85 may be displayed in real time as acquired by the memory or retrieved from a tape on the recorder 92. In any case, as a data segment is replaced by a succeeding data segment, the signals displayed, such as indicated by the displays of either FIGS. 10, 11 or 18, will be replaced by the displays of succeeding signals. These signals, while displayed, may have their display modified to amplify both the ordinate and abscissa values, for example. The signals displayed on the display 112 under the operation of Scope program 85 may be saved in any subset desired, the display may be reset, and the signal displayed may be maintained on the display 112 by an interrupt-"Pause" function of the Scope program 85. Still further, a mouse selectable zoom window may be provided to capture and amplify a portion of the data as displayed in FIG. 11, for example. Referring to FIG. 11, there is illustrated a window 85a for part of the signal trace 85b wherein the portion of the signal trace within the window 85a may be displayed by itself and subjected to the features of the Scope program 85, that is the amplification of the ordinate and abscissa. Still further, the Scope program 85 is operable to automatically adjust the time annotation indicated in FIG. 11, for example, provide for labeling individual traces and for highlighting the channels which have received a signal or compressed display signals for a particular data segment.

EVENT DETECTOR PROGRAM (DETECT)

Figure 12:
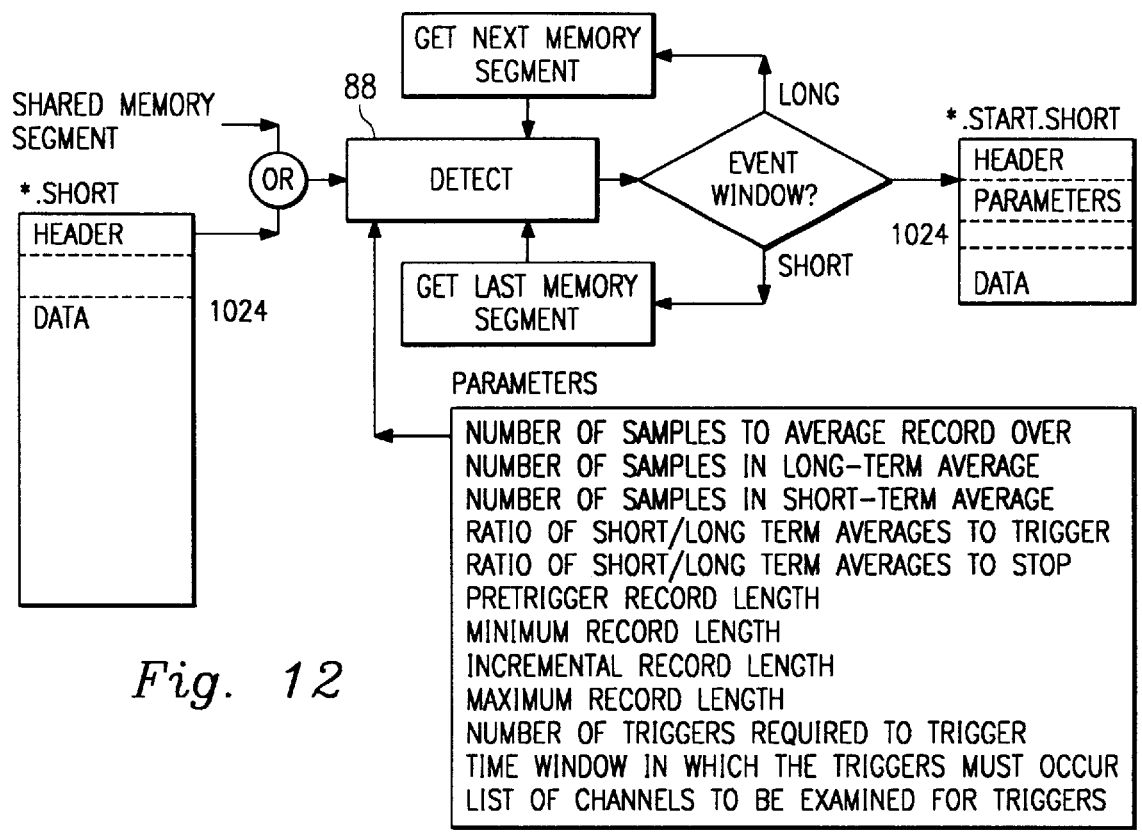
FIG. 12 is a diagram showing features of a method for identifying significant seismic events recorded by the system and method of the invention.

FIG. 12 illustrates some of the features of a micro-earthquake or seismic event detection method utilized in the present invention. The routine carried out by the event detector (i.e., Detect) program 88 is based on algorithms described in a treatise entitled "ASP: An Automated Seismic Processor for Micro-Earthquake Networks", McEvilly and Majer, The Bulletin of the Seismological Society of America, Volume 72, No. 1, pp. 303–325, February, 1982. The Detect program 88 is operable, for selected channels or signals to identify valid events based on the time and amplitude of the signals received by the geophone sensors of each pod and each array. The parameters, which are selectable to "screen out" invalid events and to save so-called valid events, are identified in FIG. 12 and are further explained in the above reference. Each memory segment may be analyzed as to how many, if any, valid events are sensed and those valid events which are identified are then given a unique identifying header and forwarded to a storage medium such as the disk 84. As indicated in FIG. 2, the Detect program 88 may also receive data from a source other than the shared memory 80.

Figure 13:
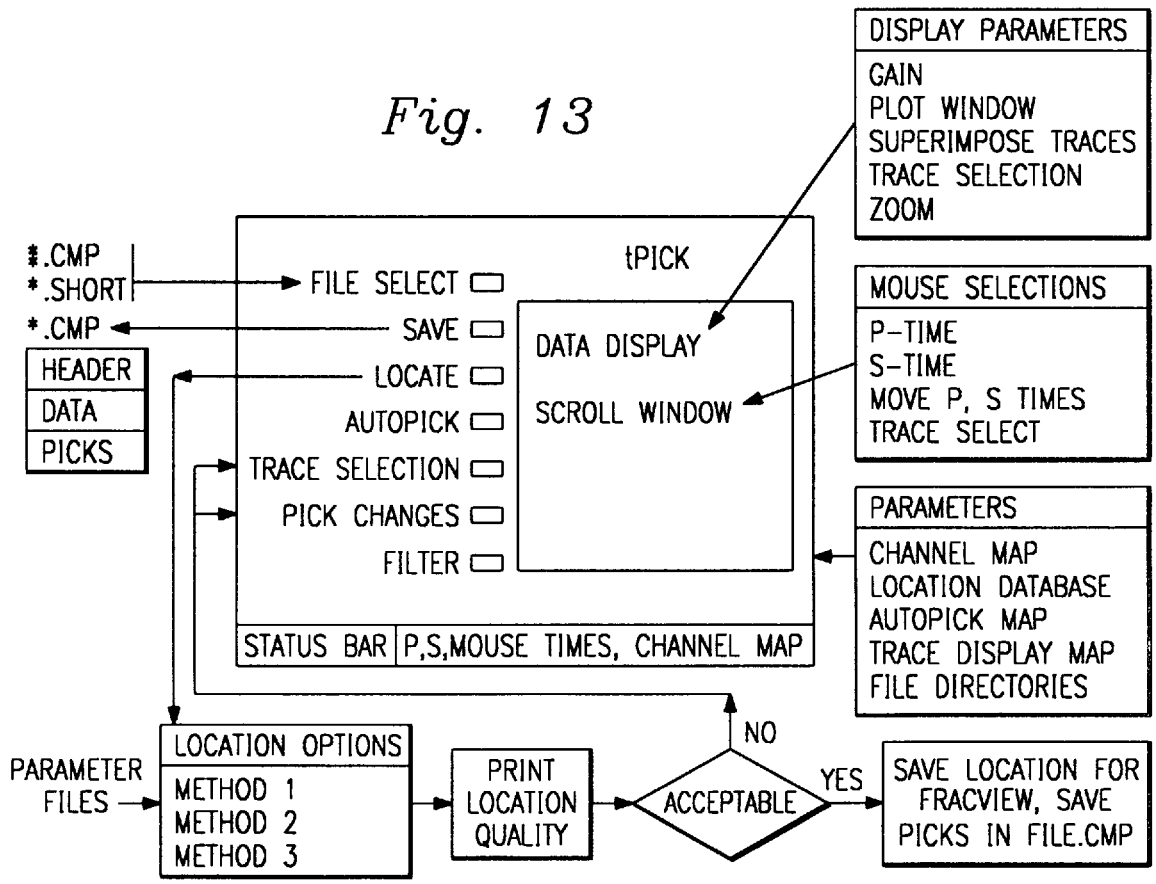
FIG. 13 is a diagram showing features of an interactive event timing and location method in conjunction with the present invention.

FIG. 13 depicts an alternative event location program (tPick) that utilizes an error minimizing method of determining the position of an event based on seismic arrival times at the monitor wells 16 and 18. Still further, the seismic event may be located using an algorithm developed by the U.S. Geological Survey.

Figure 14:
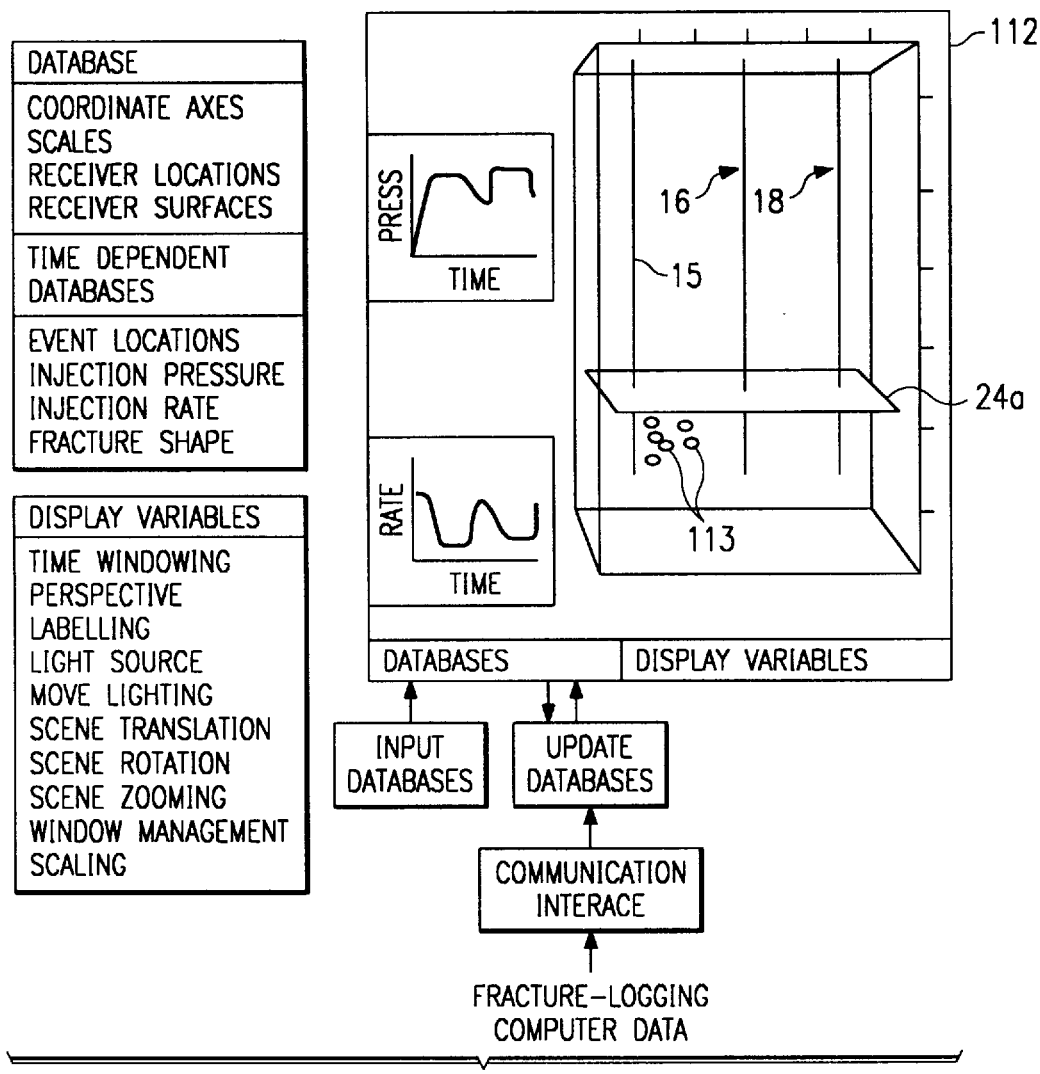
FIG. 14 is a diagram showing features of a graphical display of events indicating the three-dimensional location of the event with respect to a well and a barrier plane adjacent to a formation in which a fracture is being extended.

FIG. 14 shows one method of displaying the located events using one or more of the location methods described above and in detail below. The display 112 shows, in FIG. 14, the injection well 15, the monitor wells 16 and 18 and the upper boundary layer 24a defining the zone 24. Event locations identified by the Detect or Scope programs 88, 85 are located and displayed at positions 113, which may take the form of small ellipsoids using the calculation methods described. The event location program 14 (FasTrak) is operable to select the number of signals identified by the Detect or Scope programs 88, 85 for treatment by the event location calculation method selected.

The display program 86 (FracView) is operable to provide the three-dimensional display indicated in FIG. 14. Well trajectories, the earth's surface and downhole geophone locations, as well as the located seismic events indicated by the numerals 113 may be displayed in a three-dimensional display that can be zoomed, translated or rotated in any direction and with or without directional illumination. The seismic events displayed at 113 have a size scaled to the uncertainty of location, that is small ellipsoids indicating greater confidence in the hypo central location. The display is particularly effective in communicating the complicated geometry of fractures extending from a disposal or injection well to persons unfamiliar with data related to seismic events.

EVENT LOCATION PROGRAM (FASTRAK)

FIGS. 15–23 illustrate the features of the seismic event location (i.e., FasTrak) program 14. The program 14 is utilized to determine the location of seismic events corresponding to an extension of a fracture within an earth formation zone 22 of interest (FIG. 1). The program 14 significantly reduces the time required for locating seismic events, particularly smaller events with low signal-to-noise ratio using less-skilled staff. As will be described, the program 14 eliminates the necessity to manually pick individual phase arrivals, resulting in greatly reduced analysis time. The program 14 is a refinement of the program tPick (not shown) previously described in the parent of the present specification.

Figure 15:
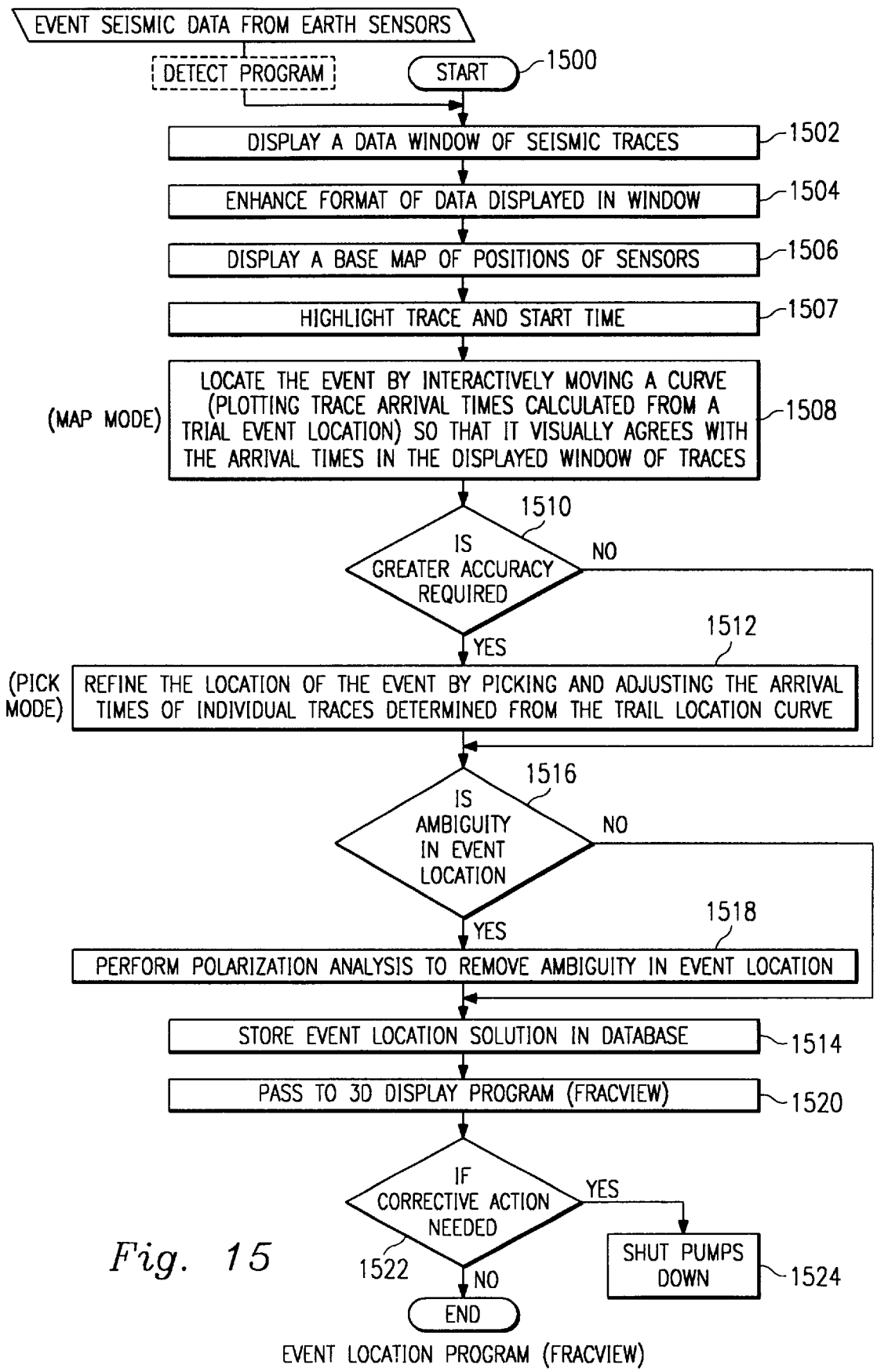
FIG. 15 is a flowchart showing the operation of the seismic event location program of FIG. 1.

FIG. 15 is a flowchart of the steps followed in the program 14 flow. FIGS. 16–23 illustrate the graphical user interface of the program 14 as presented on the display 112. It is understood that the program 14 is stored and executed on the processing unit 78 but may alternatively be stored and executed on any other computer. Suitable programming instructions (not shown) control the operation of the program 14 as described herein. Since the instructions used to implement the functions of the program 14 may be understood and written by one skilled in the art in possession of the present disclosure, they are not described in further detail herein.

Figure 16:
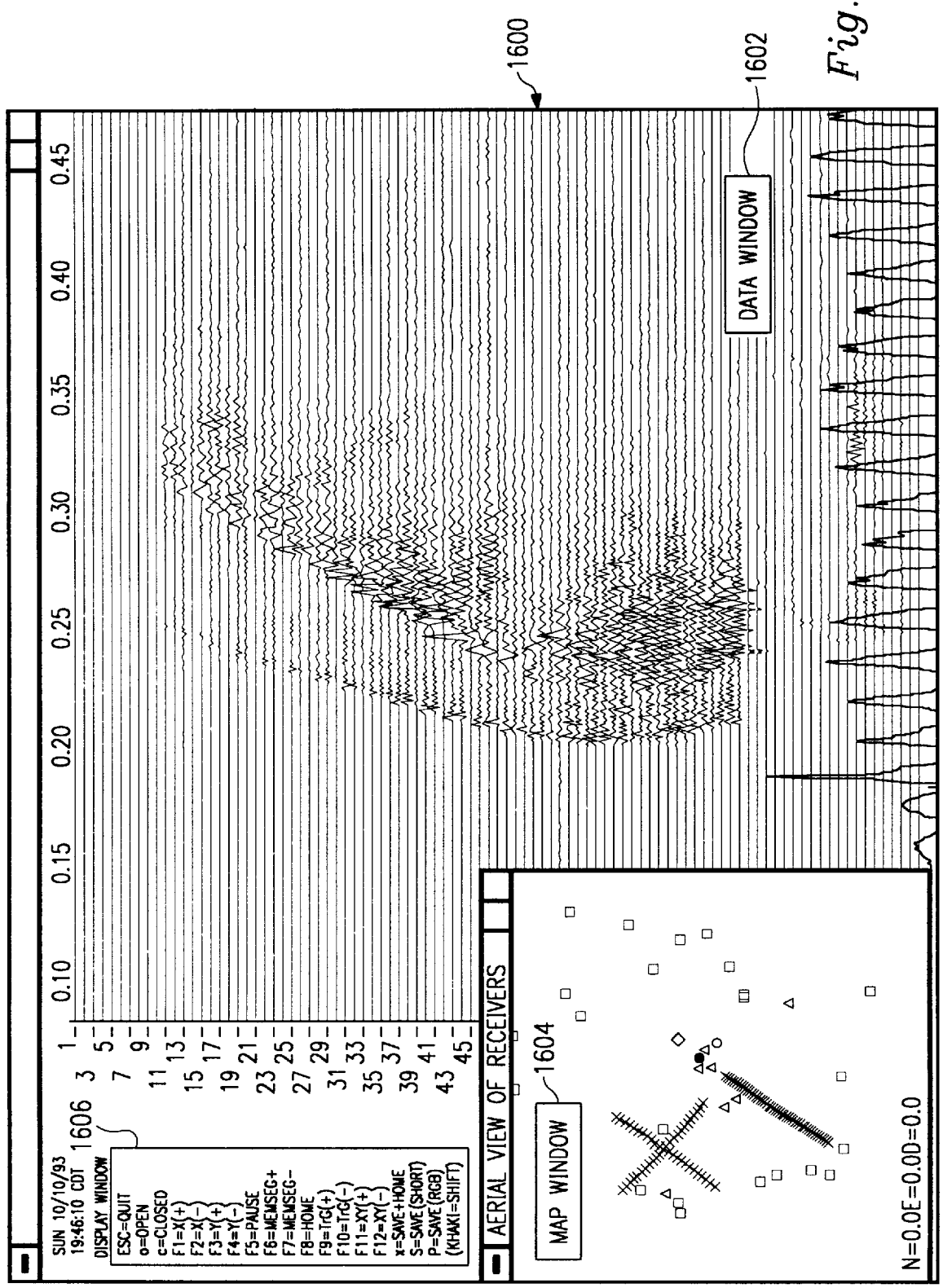

As shown in FIGS. 15 and 16, execution the the program 14 begins in step 1500 by the display of a data window 1602 in a program screen 1600. The data window 1602 is a display of seismic traces plotted vertically in increasing depth order. The seismic traces are plotted showing signal amplitude (on the vertical axis of each trace) versus time (on the horizontal axis). Each of the traces has a reference number as shown and the order of the traces displayed may be chosen from a lookup table.

The seismic event data corresponding to the displayed data traces originate from the earth formation zone 22 of interest and correspond to an extension of a fracture within the zone. As described previously, data signals are received by the processing system 12 from the sensors 56 (FIGS. 1 and 3), with the sensors being disposed in a predetermined array within the formation zone 22. The data signals are transmitted from the sensors 56 at a selected sampling rate to the A/D converter 70 within the recording computer 68 to produce corresponding digital data signals (FIG. 4). The digital data signals are stored in the recorder 92 and the memory 80. Typically, the data signals are organized in data segments containing a preselected number of data signals for a predetermined time period, e.g., ten seconds.

Step 1500 represents input of the seismic event data to the program 14. Before being input to the program 14, the seismic event data is optionally (and preferably) screened using the Detect program 88, described previously. The data segments are screened (by conditional parameters typical of those described by the Detect program 88) to select only those data segments which have a predetermined amplitude for a predetermined time (thus representing an event of interest). This is done because, as described previously, the system 10 is continuously monitoring the earth formation zone 22, thus producing large volumes of data. The Detect program 88 runs in the background to automatically track noise levels of the signals such that when a seismic event of interest occurs, i.e., when there is an anomalous event, a recording is made (including a sufficient time window prior to, and after the event or "tail") for storage and review by the program 14. In the recording of data using the Detect program 88, it is understood that since data is being collected from the system 10 in a stream of about 0.4 megabits per second on a high speed data channel (conductors 62, 64 through channel selector 66, FIG. 1), it is easy to miss events of interest and much unnecessary data must also be stored. Hence compression of data occurs wherein the Detect program 88 operates as a pattern recognition tool to store only events of interest for review by the program 14. It is understood, however, that all of the data is stored on tape for later interpretation. Note that the Scope program 85 may be used to identify events of interest and the output is stored on the disk 84.

Upon receiving the seismic data from the earth sensors 56 as filtered using the detect program 88, the event location program 14 visually displays the data segments composed of the seismic traces and performs quick and accurate processing, as described in detail below, to determine the location of the seismic event (corresponding to the location of an extension of the fracture) in a minimum time after occurrence of the event.

Still referring to FIGS. 15 and 16, the data window 1602 plots an illustrative example of data traces plotted as a function of time, the traces corresponding to a seismic event of interest to be located using the program 14. Each active trace includes a first, smaller-amplitude recording of a compressional or so-called P wave followed by a larger-amplitude recording of a shear or so-called S wave. Additional traces of auxiliary data (along the bottom of FIG. 16) may be displayed in the data window 1602. In this case a large amplitude signal from a strong motion detector are displayed, the data for which may or may not be used in the event location procedure described below.

In step 1504 the format of the data window 1602 is enhanced by the user to better view the seismic traces using options described in the Scope program 85. A display window 1606 appearing on the screen 1600 to the left of the data window 1602 operates as a control box that presents a selection of program options for changing the format.

The options may be selected by entering computer keyboard commands (using alphanumeric or function keys, as indicated) or by using a pointing device (e.g., a mouse or trackball instruction pointer) to make the selection. The format options include: increasing the spaces between the traces; changing the time scale; increasing/decreasing trace gain; plot zooming; windowing portions of the data display; and saving a window to disk or to a printer. In the display window 1606, representative command options are shown. "Open" is used to present an open display where traces at a common location (x,y,z) are each plotted as separate traces, while "Closed" is used to present a display where traces from a common point location are each plotted on the same trace line but in different colors. Function keys F1–F4 are used to increase or decrease the X and Y scales of the traces shown in the data window 1602. Function key F8 returns the display in the data window 1602 to a default display. F9, F10 increase and decrease, respectively, the gain of the signal amplitudes of the traces. F11, F12 increase and decrease, respectively, the zoom, i.e., the magnification, of the traces in the data window 1602. The color Khaki is used for clarity to indicate which command options require coincidental use of the shift key to complete the command selection.

In step 1506 a base map showing the positions of the detectors, i.e., the sensors 56, is displayed on the screen 1600 in a map window 1604. The base map is a plan (aerial) view of the locations of the receiver sensors 56 relative to the injection well 15. The map window 1604 may be sized, moved and presented in overlapping window formats as desired by the user and as necessary to suit the workstation environment.

In step 1507 a first estimate of the event depth is made by selecting and highlighting a trace in the data window 1602

Figure 17:
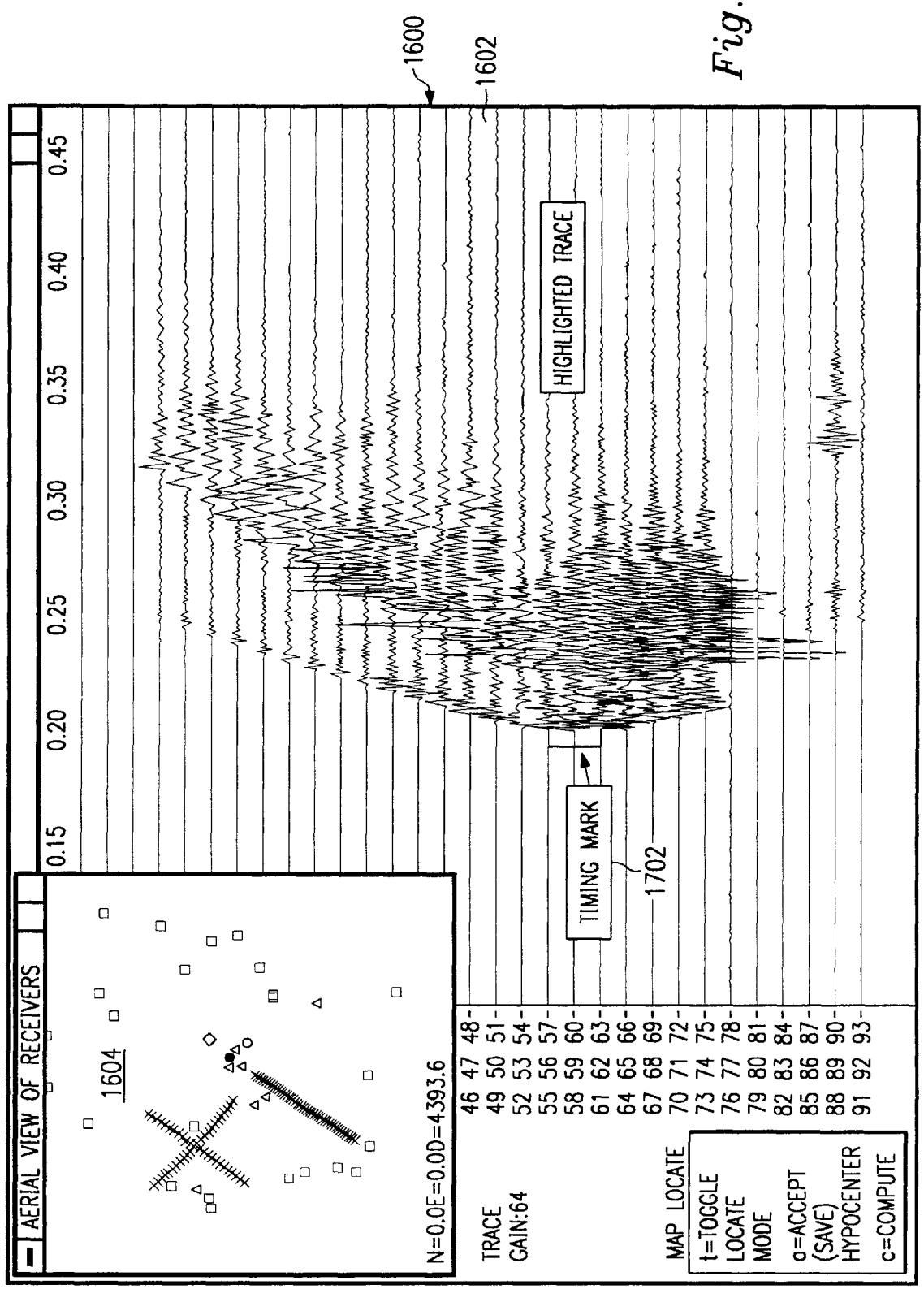

(FIG. 17, discussed below). A readout of the depth is then available in the map window 1604.

In step 1508 the seismic event is located using a "map-mode" technique. The map-mode techique uses curve matching to achieve a visual agreement between a curve plotting the arrival times of the traces (P waves or S-waves or both) calculated from a trial location, and the actual recorded data of the seismic traces shown in the data window 1602. The visual agreement is achieved by interactively moving the trial location curve so that the calculated arrival times represented by the curve visually agree with (i.e., they coincide to a best approximation in the opinion of the user) the displayed arrival times of the recorded seismic traces in the data window 1602.

Referring also to FIGS. 17 and 18, the steps in performing the event location using the map mode technique of step 1508 are illustrated. A first estimate of the event depth is made by selecting and highlighting a trace in the data window 1602. In FIG. 17 the trace "58 59 60" is highlighted (typically by color contrast) to identify the trace in the display window 1606 by clicking the mouse pointer over one of the trace annotations, say, for example, "58" whereupon the trace 58 will be highlighted in bright pink.

In this case the compressed (closed) mode display option from the display window 1606 is being used to display three traces (58, 59, 60) at similar ground locations, such as generated from a three-component geophone pod (FIG. 3), all being displayed on the same trace axis in three different colors in the data window 1602. The selected trace is preferably (but not necessarily) the trace with the earliest phase (compression wave) arrival time because the depth of this trace is a good first estimate of the source depth of the event. A timing mark 1702 is placed on this trace at a control point as shown to establish a relative time for this event. While in the present instance the timing mark 1702 and its corresponding control point are selected for a compressional wave arrival time, the selection may be either for the compressional or the shear wave arrival time (the left mouse button being used for selecting the P wave, the right mouse button being used for selecting the S wave).

Next, the cursor is moved to the base map window 1604 and a trial location 1802 is selected and plotted by the user for the seismic event as a red dot (FIG. 18). The numerical representation of the trial location 1802 is printed in a lower portion of the base map window 1604. With the depth (Z) established by trace selection using the timing mark 1702 control point, and the the X, Y position of the trial location 1802 provided in the base window 1604, it is possible to calculate arrival times at all other geophones, i.e., for all other traces. This is done by the program 14 and a calculated arrival time curve 1804 is drawn from the originally selected trace (the so-called "seeded" trace) to all other geophone locations, i.e., to all other traces in the data window 1602.

As seen in FIG. 18, the calculated arrival time curve 1804 generated from the selected trial location 1802 and the timing mark 1702 control point does not coincide exactly with the recorded, i.e., observed, compressional and shear wave arrivals for the seismic traces displayed in the data window 1602. Accordingly, the user interactively repositions (using the mouse in a "click and drag" fashion, for example) the trial location 1802 in the map window 1604. The X-Y direction of the trial location 1802 is repositioned with the mouse and the depth (Z direction) of the trial location is repositioned with the up and down arrow keys, for example. The display of the calculated arrival time curve 1804 in the window 1602 is modified in real time during the interactive repositioning of the trial location 1802 such that the curve 1804 is moved as the trial location is moved. Thus the user can interactively reposition the curve 1804 by moving the trial location 1802, so that the curve visually coincides with the observed compressional and shear arrival times of the traces. Even greater accuracy is achieved by changing the data window 1602 and the base map window 1604 scales (e.g., by zooming in).

Once an acceptable match between calculated and observed data is achieved by coincidence of the curve 1804 with the observed arrival times of the traces in the window 1602, the accepted location 1802 with its calculated arrival times at each data channel represented by the curve 1804 are then stored as a solution in a database as indicated in step 1514. This assumes that no greater accuracy in the event location solution is required as indicated in step 1512. The stored solution may then be displayed in three-dimension using the FracView visualization program (FIG. 14) or otherwise processed. The location is judged for its acceptability and origin. If it is attributable to noises generated by normal oil field operations the solution is discounted. If not, the solution is assumed to be created by fracturing operations. A decision is made whether the fracture is growing as expected in an acceptable manner; if not, a decision is made to cease fracture generation.

The process of event location using the map mode technique of step 1508 by selecting traces and moving the trial location 1802 to fit the curve 1804 to the observed arrival times of the traces (hereinafter referred to as the "map location process") is extremely rapid and can be accomplished with reasonable accuracy (e.g., within less than fifty feet) with minimal training of the operator.

Figure 19:
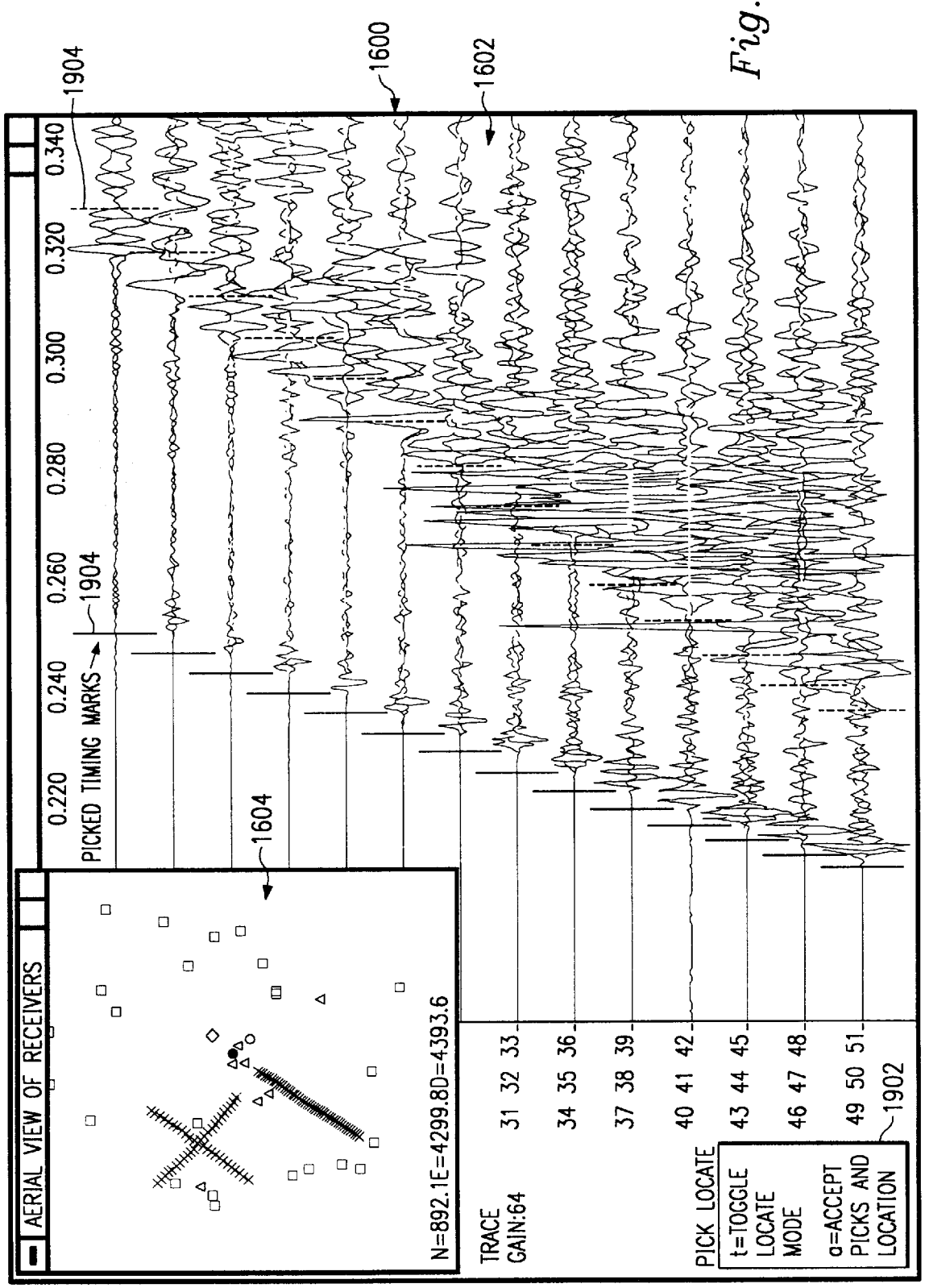

Referring to FIGS. 15 and 19, further refinement in the location of the event is achieved with the program 14. In step 1510 a determination is made that greater accuracy in event location is required by the user than can be achieved with the map location process just described. In some cases a more accurate location of the seismic event can be obtained by modifying the shear and compressional arrival times at individual recording (trace) locations, because some sensor locations have varying delay times due to local conditions such as cement thickness, coupling or the like. In addition, due to changes in the rock formation due to the presence of the fracture, more complicated or changed velocity may be required. These can be introduced here.

To compensate for these anomalies, in step 1512 the program 14 executes a pick mode technique to refine the location of the event by picking and adjusting the calculated arrival times of individual traces determined from the curve 1804 in the previously described map location process. Once the arrival times of individual traces are adjusted, a functional analysis such as a least-squares fit analysis is performed on the arrival time data to produce a more accurate event location solution (i.e., a solution that better matches the data). Other well-known event location algorithms (other than a least-squares fit analysis) may likewise be used on the adjusted arrival time data to determine the event location, as will be recognized by those skilled in the art.

As shown in FIG. 19, the pick mode is initiated by entering an instruction in the Pick Locate instruction box 1902. The calculated arrival times, determined from the map location process and represented by the moved curve 1804, are converted to discrete picked timing marks 1904 for each of the traces. The timing marks 1904 (representing the previously calculated arrival times), or selected ones of them, are then manually moved by the user to locations that more accurately match the observed arrival time data.

Once the moved timing marks 1904 are in the locations desired by the user, an instruction is entered by the user to use the arrival times thus selected for each trace (by the moved timing marks 1904 and possibly others left unchanged) to locate the seismic event position and occurrence time. More specifically, an instruction in the Pick Locate box 1902 is entered to accept the picks, whereupon the program 14 then performs a functional analysis (such as a least squares fit analysis) to determine the new and refined event location based upon the adjustments to the arrival times of the traces. The refined event location is shown as discribed below with respect to FIG. 20 and is also displayed in the map window 1604 as a spot of white color.

Figure 20:
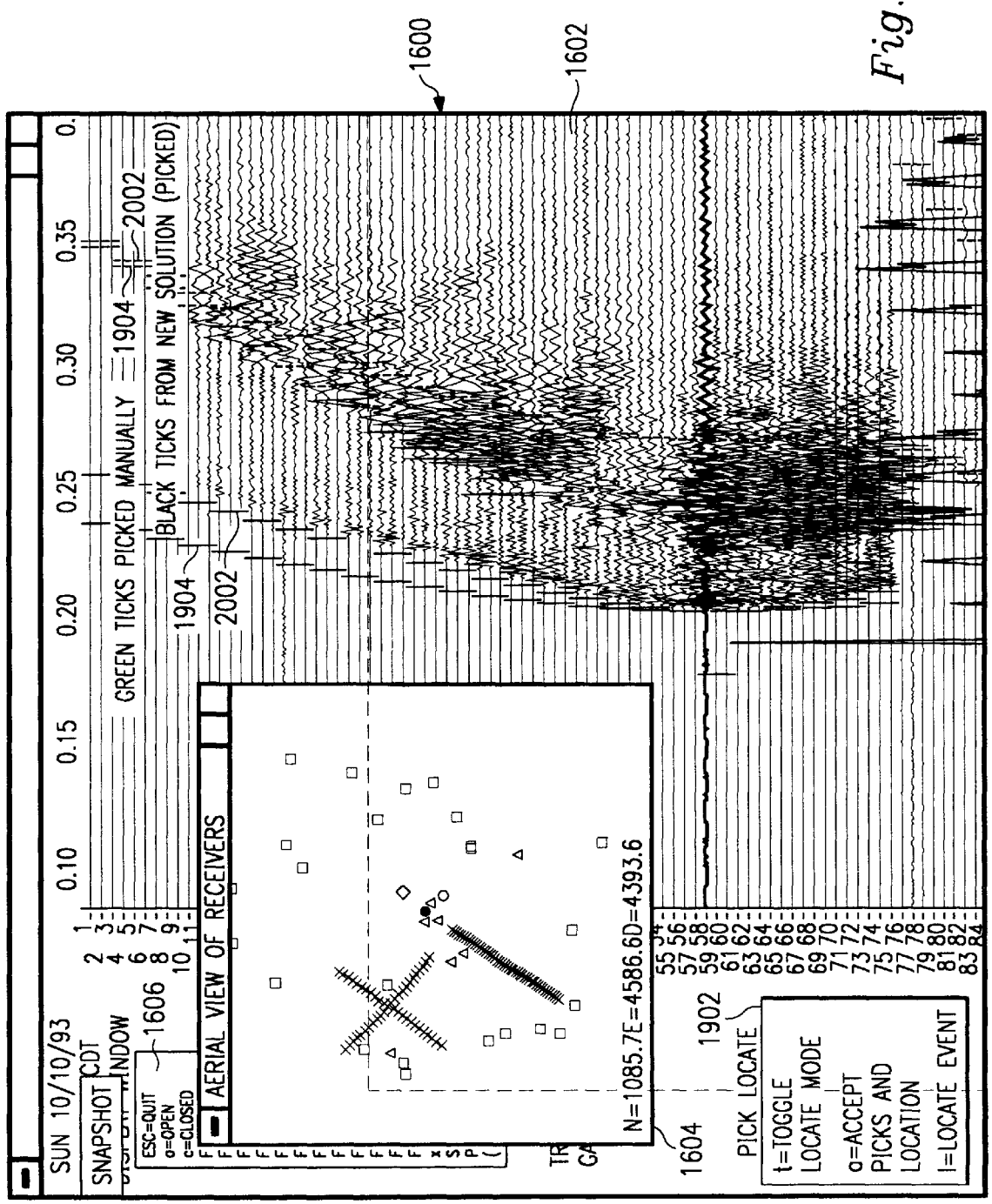

As illustrated in FIG. 20, once the finctional analysis (i.e., the inversion) is performed to fit the data to the newly picked arrival times, the data window 1602 displays the picked timing marks 1904 (in green, for example) and also displays newly calculated arrival timing marks 2002 (in black bold dashes, for example) corresponding the the least squares fit (or other functional analysis) performed on the trace data. The picked timing marks 1904 and the newly calculated arrival time marks 2002 are presented in differing colors on each trace for comparison purposes. The user may then make a judgment on the acceptability of the agreement between the newly calculated arrival times (marks 2002) and the observed and picked arrival times (marks 1904). Frequently, minor adjustments to the picked arrival timing marks 1904 are necessary, and the process is repeated accordingly, until some acceptance criteria is passed. The criteria is, for example, when the root-mean-square (RMS) of the residual of the the mismatch at each trace is below a set value (such as 6 ms or 50 feet).

As illustrated in FIG. 21, a tabulation of the statistical analysis of the agreement between the picked and newly calculated arrival times may be generated. It may be printed or displayed in a window on the screen 1600 in real time during the inversion process and may be stored for further evaluation. The FIG. 21 table, indicated by the reference numeral 2102, lists the P-Arrival, S-Arrival and P and S Computed for each Station/Channel (P/S). The Station/Channel indicates the station (i.e., the physical ground position, e.g., 1001), the receiver (the receiver upon which trace is recorded, i.e., rid=1, and the channel (or trace) number, i.e., tid=1). The P-Arrival represents the P wave (compressional) wave arrival time (e.g., 0.253), followed by the difference (in parenthesis, e.g., –0.882) between the newly calculated P wave arrival time (as determined by the functional analysis, e.g., the least squares analysis represented by the black timing marks 2002) and the picked P wave arrival time (represented by the picked and moved timing mark 1904). The S-Arrival represents the S wave (shear) wave arrival time (e.g., 0.352), followed by the difference (in parenthesis, e.g., –2.150) between the newly calculated S wave arrival time (as determined by the functional analysis, e.g., the least squares analysis represented by the black timing marks 2002) and the picked S wave arrival time (represented by the picked and moved timing mark 1904). The P/S Computed column represents the newly calculated arrival times (P wave and S wave) as calculated by the finctional analysis or the event location determined by the inversion, as represented by the calculated timing marks 2002. At the bottom of the table 2102 is an indication of the quality of the agreement between the picked and newly calculated arrival times, which in the present case is a "5," indicating poor quality (i.e., the differences between newly calculated and picked arrival times are large). The process can then be repeated of picking and performing the functional analysis until a good agreement is achieved.

Various statistical analyses may be diplayed here after a solution of acceptable quality (Q=1) is determined. These include RMS agreement calculations and ellipsoids of uncertainty for each event.

The result is an improved location of the seismic event using more detailed analysis of the arrival times, a possibly more sophisticated model of the velocity, and a more quantified analysis of the quality of the solution determined.

If there is no ambiguity in the event location (discussed further below), as determined in step 1516, the event location solution as finally determined is stored in step 1514 in a database for further analysis.

Figure 22:
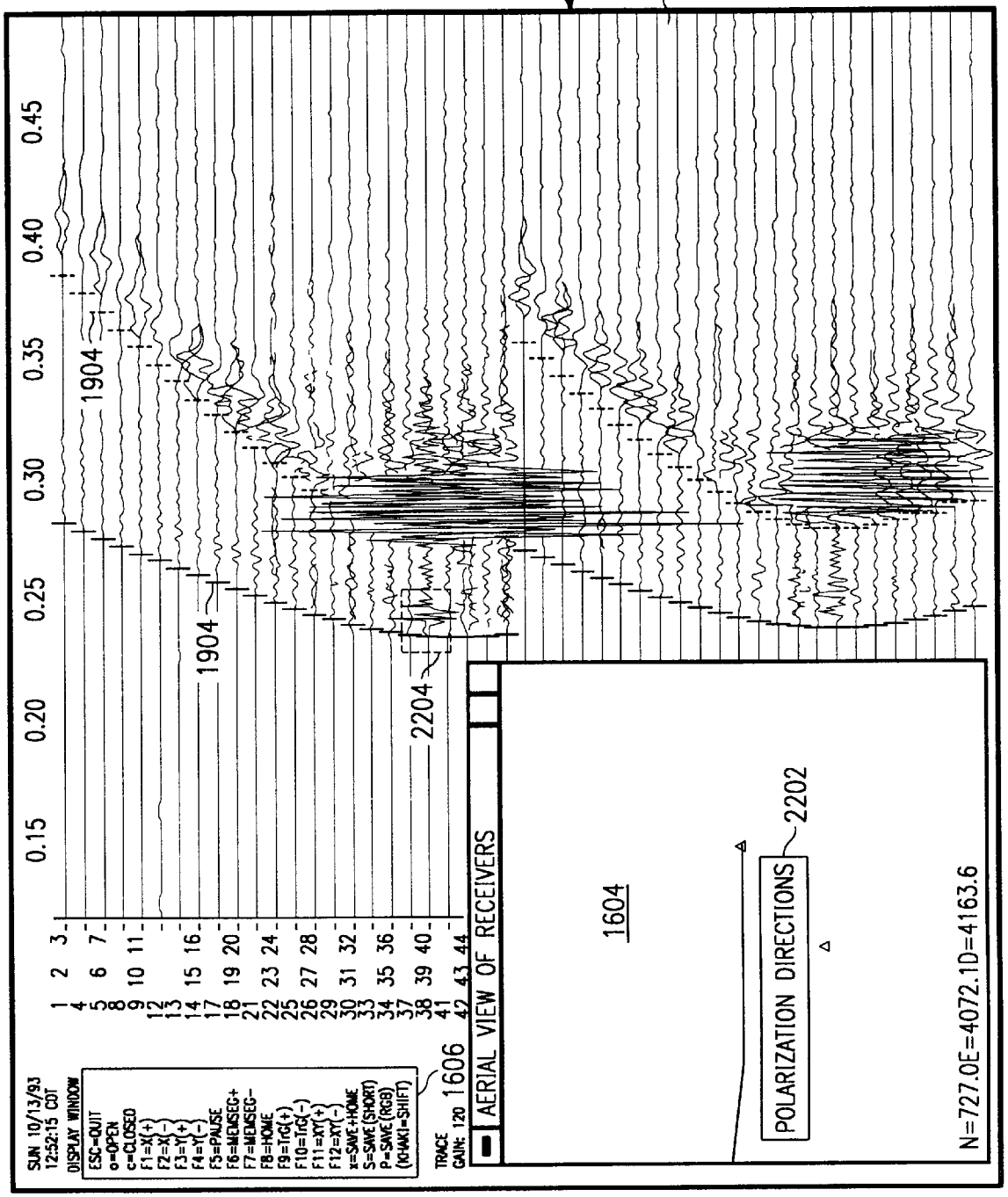

FIG. 22 illustrates the performance of a polarization (hodogram) analysis on the arrival time data. In some receiver (geophone sensor) geometries there exists ambiguity in the calculated event location based upon arrival time alone, because equally acceptable event locations may be determined using the foregoing methods.

As shown in step 1518 (FIG. 15), a polarization analysis is used to remove the ambiguity in the location of the event. First, data collected to determine the velocity of the formation medium in the zone 22 is used to determine the orientation of the geophone sensors 56. The sensors 56 are typically three orthogonal sensors mounted close together in a pod 50. The orientation of each sensor 56 is stored in a database along with the location of each sensor and used as an input parameter file for the program 14. Optionally, data for certain traces may be modified wherein the arrival time signals for the three sensor components are mathematically rotated into a principal coordinate system, usually north, east and vertical depth. Stated another way, a mathematical vector multiplication is performed on the sensor signal data to indicate what would be the equivalent arrival time signal from each sensor component if the sensor component was pointed in the directions of the principal coordinate system. This is done for consistency of display purposes between the different sensor pods using a known calibration position (e.g., such as from a point of an explosion).

Referring to the data window 1602 (FIG. 22), a trace (e.g., 38, 39, 40) is selected and highlighted. A timing mark is indicated for the trace. Next, a time window is defined around the selected timing mark, the size and shape (symmetric, asymmetric) being retrieved from a parameter file.

The program 14 then computes the polarization, i.e., the direction of arrival for each of the arrival time samples within the time window 2204. It is understood that different arrival time samples will be received from each of the different directional sensor components (traces 38, 39, 40) and each such trace of arrival time samples will be highlighted in a different color.

Next, vectors representing the directions of the arrival time samples are plotted in the map window 1602 as indicated by vectors 2202. The direction of the vectors 2202 is determined using the arrival time sample and the orientation data stored in the database indicating the direction that the sensor is pointed in. Each of the vectors 2202 represent what orientation the seismic source came from, as indicated by the directional information of the geophone sensors and the amount of energy (amplitude) in each of the traces. The vectors 2202 are thereby drawn that indicates the direction of the arrival time signal based on the amplitude of the sample and the direction (or orientation) of the geophone sensor. The length of each vector 2202 is drawn proportional to the amplitude of the arrival amplitudes at each time sample. If, for example, there was a purely polarized arrival all the orientations derived from samples within the data window would point in the same direction.

The direction and length of the vectors 2202 thus represent the motion of the ground at the geophone. The motion is produced by the passing seismic wave initiated by the rupture event. The particle motion can be visualized on the map window by plotting the vectors for each sample of the recorded signals from the geophone. Data from all three components at a single location are necessary to calculate this information and makes use of the geophone orientation data stored in the input files.

The number of time samples, and hence vectors 2202, depends on the size of the window 2204 and typically includes about 5–10 time samples. Thus the vectors 2202 are lines representing a direction defined by the amplitude of the arrival time signal in each of the directions defined by the coordinate system, the length of such line being proportional to the amplitudes of the arrival time signals.

Once the polarization direction vectors 2202 are drawn, removal of ambiguity in the event location solution is accomplished by comparison of the vector 2202 with the trial location 1802 (FIG. 18). The trial location 1802 is able to be then moved along a path defined by the lines, such that ambiguity in the event location is removed. When the trial location 1802 is moved to be on the polarization vector 2204, the event location is considered to be accurately determined with the least ambiguity.

As the trial location is moved to be on the vector 2202 the curve 1804 changes and an optimal solution is achieved when the calculated and observed arrival times coincide. Several traces are usually examined for consistency in polarization.

Referring again to FIG. 15, after performance of the polarization analysis (unless such is not needed in step 1516), the event location solution as finally determined is stored in step 1514 in a database for further analysis In step 1520, the event location solution is passed to the Display program (FracView) 86 (FIG. 14), for viewing in three-dimension to determine if a problem exists or not. For example, seeing the event location solution in three-dimensional space (FIG. 14) enables the user to determine, e.g., if the event (i.e., a fracture) is above the control horizon 24a or near a well or if some other condition exists that would result in an environmental hazard. In step 1522 a decision by the user based on the review is made and if the three-dimensional review indicates that corrective action is not required, then for that event the procedure ends and further monitoring of other subsequent events can occur. However, if in step 1522 corrective action is indicated, then in step 1514 the pumps, i.e., the injection system 20, is shut down so that the integrity of the zone 24 is maintained.

Figure 23:
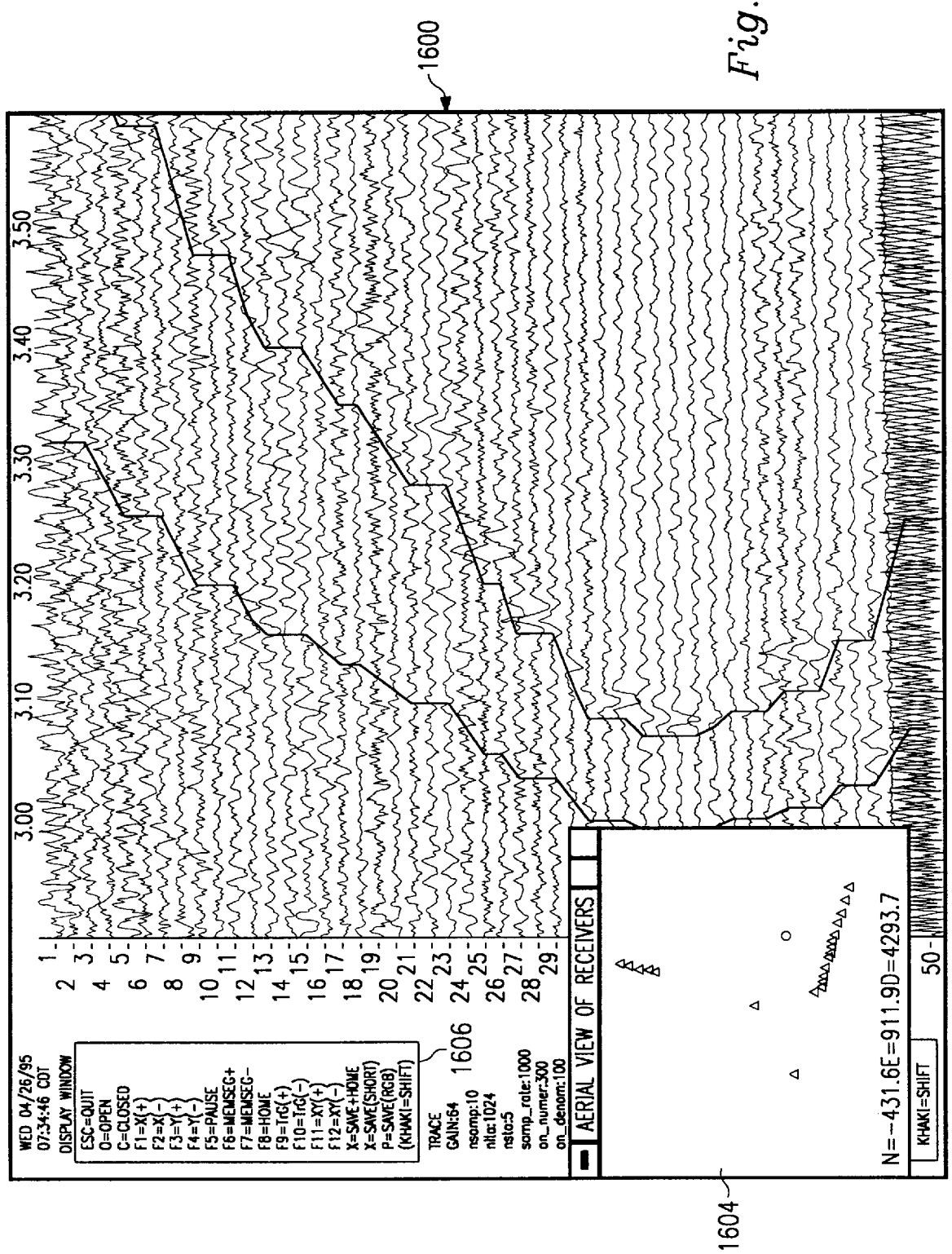

FIG. 23 illustrates an example of a data window 1602 for traces which have very weak arrival time signals in a high noise background from an actual survey. Using the program 14 on the survey permits extremely weak events to be located that would not otherwise be easily accomplished except by a highly trained engineer.

Thus the system 10 and particularly the program 14 offers several advantages. It reduces the time to determine the location from several hours to several minutes without loss of accuracy. The program 14 is user friendly, and minimal training is needed for operators who are only using map location arrival time curve matching, as this procedure requires very little experience in phase identification. The trial event location solution obtained from the map location arrival time curve matching technique aids greatly in phase identification when subsequent manual picking is required. Thus the program 14 continues to offer options using operator picked arrival times with greater accuracy at a higher speed than routinely done due to the map location trial solution.

Software for the completely automated picking of arrival phases may also be utilized with the program 14. This would further decrease the time needed to derive a map location for a given event under certain signal-to-noise conditions. Further, deriving locations from sensors in a single monitor location is possible. It also has been demonstrated that a single 3-component sensor can provide a unique location using P and S arrival times together with a polarization analysis of the type described above. It is understood that it is not possible to locate events using a least square event location code from a single vertical well because of non-uniqueness. Increasing the number of monitor wells required in such an inversion negatively impacts the cost of a project, and therefore polarization analysis, combined with the rapid calculation of arrival times, allows for a single monitor well location of events at the least field cost.

Those skilled in the art will recognize from the foregoing description that a unique system and program for seismic event location corresponding to a hydraulic fracture extension or propagation in a predetermined earth formation zone of interest may be carried out with the invention as described above. Although a preferred embodiment has been described in some detail, those skilled in the art will also recognize that various substitutions and modifications may be made without departing from the scope and spirit of the invention as recited in the appended claims.

What is claimed is:

1. A computer program for determining the location of a seismic event in an earth formation zone using seismic traces corresponding to the event collected from one or more sensors in the zone, the program being stored on a computer-readable media for operation by a user on a computer having a graphical user interface, the program comprising:

instructions for displaying a graphical data window of the seismic traces corresponding to the event, the traces representing observed arrival time signals from the sensors plotted with respect to time;

instructions for displaying a window of a base map of the positions of the one or more sensors within the zone; and instructions for map-locating the event by displaying in the graphical data window a curve plotting calculated arrival time signals for the traces, the curve being developed from a user-selected trial location of the event selected in the base map window, the curve then being repositioned to visually coincide with the observed arrival time signals of the traces and thereby indicate the location of the event based on the changes in the calculated arrival time signals caused by the repositioning of the curve.

2. The program of claim 1 further comprising instructions for repositioning the curve wherein the curve is graphically moved in correspondence with movement of the trial location in the map window.

3. The program of claim 1 further comprising instructions for performing the repositioning with an instruction pointer operated by the user.

4. The program of claim 1 further including instructions for pick-locating the event to further refine its location after the map-locating, comprising:

instructions for displaying timing marks at the positions of the curve on the traces;

instructions for repositioning the timing marks at picked ones of the traces, the timing marks being repositioned to more accurately visually coincide with the observed arrival time signals, and instructions for performing a functional analysis on the calculated arrival time signals following repositioning of the timing marks to yield a refined location of the event based on the changes in the calculated arrival time signals caused by the repositioning of the timing marks.

5. The program of claim 4 wherein the finctional analysis is a least-squares statistical analysis.

6. The program of claim 4 further including instructions for automatically picking the traces for which the timing marks are to be repositioned.

7. The program of claim 1 further including instructions for providing options in formatting of the display of the seismic traces in the graphical data window.

8. The program of claim 7 wherein the formatting options include one or more of plot zooming, changing the trace gain, changing the time scale, and changing the spacing between traces.

9. The program of claim 1 wherein the map locating instructions further comprise:

instructions for selecting a trace in the graphical data window wherein the trace becomes highlighted;

instructions for selecting an observed arrival time of a trace to provide a timing mark through which an analytically predicted time of the curve passes through, such that all calculated arrival times of the curve are determined relative to the timing mark;

instructions for selecting a trial location of the seismic event in the map window wherein the selected trial location is highlighted;

instructions for displaying the coordinates of the location of the event as determined by the curve repositioning; and instructions for storing the calculated arrival times and the event location as determined by the curve repositioning.

10. The program of claim 4 wherein the pick-locating instructions further comprise:

instructions for converting the curve to timing marks representing the portions of the curve corresponding to the calculated arrival time signals; and instructions for highlighting a trace for which timing mark repositioning is to occur.

11. The program of claim 10 wherein the pick-locating instructions further comprise:

instructions for generating a tabulation of the extent of agreement between the repositioned calculated arrival times and the observed arrival times as indicated by the functional analysis performed.

12. The program of claim 1 further including a polarization analysis to remove ambiguity in the location of the seismic event, the one or more sensors for collecting the event data including differently-oriented sensor components and wherein the orientation of each component is stored with the location of the sensor, the polarization analysis instructions comprising:

instructions for rotating the observed arrival time signals into a directional coordinate system using the stored component orientation information;

instructions for user-selection of one of the observed arrival time signals for a trace and for providing a timing mark on the trace through which the curve passes through;

instructions for retrieving from a parameter file a defined window around the selected timing mark;

instructions for drawing a line in the map window from the location of the sensor for each of the observed arrival time signals in the defined window, in a direction defined by the amplitude of the arrival time signal in each of the directions defined by the coordinate system, the length of the line being proportional to the amplitudes of the arrival time signals;

instructions for moving the trial location along the path defined by the lines, such that ambiguity in the event location is removed.

13. A computer program for determining the location of a seismic event in an earth formation zone using seismic traces corresponding to the event collected from one or more sensors in the zone, the program being stored on a computer-readable media for operation by a user on a computer having a graphical user interface, the program comprising:

instructions for displaying a graphical data window of the seismic traces corresponding to the event, the traces representing observed arrival time signals from the sensors plotted with respect to time;

instructions for displaying a window of a base map of the one or more sensors within the zone;

instructions for displaying in the graphical data window a curve plotting calculated arrival time signals for the traces, the curve being developed from a user-selected one of the observed arrival time signals displayed in the graphical data window and from a user-selected trial location of the event selected in the base map window; and instructions for user-repositioning of the trial location in the base map window such that the displayed curve moves in correspondence with the repositioning of the trial location, the trial location being repositioned by the user until an acceptable visual coincidence of the curve is reached with the observed arrival time signals of the traces to thereby yield the location of the event.

14. The program of claim 13 further including instructions for refining the location of the event, comprising:

instructions for segmenting the curve, each such segment corresponding to one of the traces and representing the calculated arrival time signal for the corresponding trace;

instructions for user-repositioning of user-selected ones of the curve segments; and instructions for performing a functional analysis on the calculated arrival time signals following user-repositioning to yield a refined location of the event.

15. The program of claim 14 wherein the instructions for refining the location of the event further comprise:

instructions for displaying a set of new curve segments on the traces in the graphical display window, the new curve segments representing recalculated arrival time signals following performance of the functional analyis;

instructions for user-repositioning of user-selected ones of the new curve segments, such that a subsequent functional analysis is performed on the calculated arrival time signals following the user-repositioning to yield a further refined location of the event.

16. The program of claim 13 further including a polarization analysis to remove ambiguity in the location of the seismic event, the one or more sensors for collecting the event data including differently-oriented sensor components and wherein the orientation of each component is stored with the location of the sensor, the polarization analysis instructions comprising:

instructions for rotating the observed arrival time signals into a directional coordinate system using the stored component orientation information;

instructions for user-selection of one of the observed arrival time signals for a trace and for providing a timing mark on the trace through which the curve passes through;

instructions for retrieving from a parameter file a defined window around the selected timing mark;

instructions for drawing a line in the map window from the location of the sensor for each of the observed arrival time signals in the defined window, in a direction defined by the amplitude of the arrival time signal in each of the directions defined by the coordinate system, the length of the line being proportional to the amplitudes of the arrival time signals;

instructions for moving the trial location along the path defined by the lines, such that ambiguity in the event location is removed.

17. A computer program for determining the location of a seismic event in an earth formation zone using seismic traces corresponding to the event collected from one or more sensors in the zone, the program being stored on a computer-readable media for operation by a user on a computer having a graphical user interface, the program comprising:

instructions for displaying a graphical data window of the seismic traces corresponding to the event, the traces representing observed arrival time signals from the sensors plotted with respect to time;

instructions for displaying a window of a base map of the positions of the one or more sensors within the zone;

instructions for generating a map-locating the event by displaying in the graphical data window a curve plotting calculated arrival time signals for the traces, the curve being developed from a user-selected one of the observed arrival time signals displayed in the graphical data window and from a user-selected trial location of the event selected in the base map window, followed by user-repositioning of the trial location in the base map window such that the displayed curve moves in correspondence with the repositioning of the trial location, the trial location being repositioned by the user until an acceptable visual coincidence of the curve is reached with the observed arrival time signals of the traces to thereby yield the location of the event; and instructions for pick-locating the event to further refine its location after the map-locating, including displaying timing marks at positions of the curve on the traces, repositioning picked ones of the timing marks to more accurately visually coincide with the observed arrival time signals, and performing a functional analysis on the calculated arrival time signals following repositioning of the timimg marks to yield a refined location of the event based on the changes in the calculated arrival time signals caused by the repositioning of the timing marks.

18. A method for determining the location of a seismic event in an earth formation zone using seismic traces corresponding to the event collected from one or more sensors in the zone, the method for performance by a user on a computer having a graphical user interface, the method comprising:

displaying a graphical data window of the seismic traces corresponding to the event, the traces representing observed arrival time signals from the sensors plotted with respect to time;

displaying a window of a base map of the positions of the one or more sensors within the zone; and map-locating the event by displaying in the graphical data window a curve plotting calculated arrival time signals for the traces, the curve being developed from a user-selected trial location of the event selected in the base map window, the curve then being repositioned to visually coincide with the observed arrival time signals of the traces and thereby indicate the location of the event based on the changes in the calculated arrival time signals caused by the repositioning of the curve.

19. The method of claim 18 further comprising repositioning the curve wherein the curve is graphically moved in correspondence with movement of the trial location in the map window.

20. The method of claim 18 further comprising performing the repositioning with an instruction pointer operated by the user.

21. The method of claim 18 further including pick-locating the event to further refine its location after the map-locating, comprising:

repositioning timing marks for traces of the curve corresponding to the calculated arrival time signals at picked ones of the traces, the timing marks being repositioned to more accurately visually coincide with the observed arrival time signals, and performing a functional analysis on the calculated arrival time signals following repositioning of the timing marks to yield a refined location of the event based on the changes in the calculated arrival time signals caused by the repositioning of the timing marks.

22. The method of claim 21 wherein the functional analysis is a least-squares statistical analysis.

23. The method of claim 21 further including automatically picking the traces for which timing marks are to be repositioned.

24. The method of claim 18 further including providing options in formatting of the display of the seismic traces in the graphical data window.

25. The method of claim 24 wherein the formatting options include one or more of plot zooming, changing the trace gain, changing the time scale, and changing the spacing between traces.

26. The method of claim 18 wherein the map locating method further comprises:

selecting a trace in the graphical data window wherein the trace becomes highlighted;

selecting an observed arrival time of a trace to provide a timing mark through which an analytically predicted time of the curve passes through, such that all calculated arrival times of the curve are determined relative to the timing mark;

selecting a trial location of the seismic event in the map window wherein the selected trial location is highlighted;

displaying the coordinates of the location of the event as determined by the curve repositioning; and storing the calculated arrival times and the event location as determined by the curve repositioning.

27. The method of claim 21 wherein the pick-locating method further comprises:

converting the curve to timing marks corresponding to the calculated arrival time signals; and highlighting a trace for which repositioning is to occur.

28. The method of claim 27 wherein the pick-locating method further comprises generating a tabulation of the extent of agreement between the repositioned calculated arrival times and the observed arrival times as indicated by the functional analysis performed.

29. The method of claim 18 further including a polarization analysis to remove ambiguity in the location of the seismic event, the one or more sensors for collecting the event data including differently-oriented components at the same location and wherein the orientation of each component is stored with the location of the sensor, the polarization analysis comprising:

rotating the observed arrival time signals into a directional coordinate system using the stored component orientation information;

user-selection of at least one of the observed arrival time signals for a trace and providing a timing mark on the trace through which the curve passes through;

drawing a line in the map window from the location of the sensor for each of the selected observed arrival time signals, in a direction defined by the amplitude of the arrival time signal in each of the directions defined by the coordinate system, the length of the line being proportional to the amplitudes of the arrival time signals; and moving the trial location along the path defined by the lines, such that ambiguity in the event location is removed.

30. A system for determining the location of an extension of a hydraulic fracture within an earth formation zone of interest comprising:

seismic signal sensors placed in an array with respect to the formation zone;

means for transmitting signals relating to an event caused by extension of the fracture from the sensors at a predetermined sampling rate to a memory device;

means for selectively retrieving the signals from the memory device and determining the location of the event by displaying a graphical data window of the seismic traces corresponding to the event, the traces representing observed arrival time signals from the sensors plotted with respect to time; displaying a window of a base map of the positions of the sensors within the zone; and displaying in a graphical data window a curve plotting calculated arrival time signals for the traces, the curve being developed from a user-selected trial location of the event selected in the base map window, the curve then being repositioned to visually coincide with the observed arrival time signals of the traces and thereby indicate the location of the event based on the changes in the calculated arrival time signals caused by the repositioning of the curve.

\* \* \* \* \*